United States Patent
Miikkulainen et al.

(10) Patent No.: US 11,803,730 B2
(45) Date of Patent: *Oct. 31, 2023

(54) WEBINTERFACE PRESENTATION USING ARTIFICIAL NEURAL NETWORKS

(71) Applicant: Evolv Technology Solutions, Inc., San Francisco, CA (US)

(72) Inventors: Risto Miikkulainen, Stanford, CA (US); Neil Iscoe, Austin, TX (US)

(73) Assignee: Evolv Technology Solutions, Inc., San Francisco, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 17/027,615

(22) Filed: Sep. 21, 2020

(65) Prior Publication Data

US 2021/0004659 A1 Jan. 7, 2021

Related U.S. Application Data

(63) Continuation of application No. 15/399,523, filed on Jan. 5, 2017, now Pat. No. 10,783,429.

(Continued)

(51) Int. Cl.
*G06N 3/04* (2023.01)
*G06F 16/26* (2019.01)
(Continued)

(52) U.S. Cl.
CPC .............. *G06N 3/04* (2013.01); *G06F 3/0484* (2013.01); *G06F 11/3664* (2013.01);
(Continued)

(58) Field of Classification Search
None
See application file for complete search history.

(56) References Cited

U.S. PATENT DOCUMENTS

| 4,935,877 A | 6/1990 | Koza |
| 5,136,686 A | 8/1992 | Koza |

(Continued)

FOREIGN PATENT DOCUMENTS

| CN | 103853656 A | 6/2014 |
| CN | 104734918 A | 6/2015 |

(Continued)

OTHER PUBLICATIONS

"It's All A/Bout Testing: The Netflix Experimentation Platform", Apr. 29, 2016, 9 pages, [Retrieved Oct. 4, 2016]. Retrieved from the Internet <URL: http://techblog.netflix.com/2016/04/itsallabout-testingnetflix. html>.

(Continued)

*Primary Examiner* — Wilbert L Starks
(74) *Attorney, Agent, or Firm* — Haynes Beffel & Wolfeld LLP; Andrew L. Dunlap

(57) ABSTRACT

Roughly described, the technology disclosed provides a so-called machine-learned conversion optimization (MLCO) system that uses artificial neural networks and evolutionary computations to efficiently identify most successful webpage designs in a search space without testing all possible webpage designs in the search space. The search space is defined based on webpage designs provided by marketers. Neural networks are represented as genomes. Neural networks map user attributes from live user traffic to different dimensions and dimension values of output funnels that are presented to the users in real time. The genomes are subjected to evolutionary operations like initialization, testing, competition, and procreation to identify parent genomes that perform well and offspring genomes that are likely to perform well.

20 Claims, 13 Drawing Sheets

Related U.S. Application Data

(60) Provisional application No. 62/275,074, filed on Jan. 5, 2016, provisional application No. 62/275,058, filed on Jan. 5, 2016.

(51) Int. Cl.

| | |
|---|---|
| G06F 16/23 | (2019.01) |
| G06F 16/958 | (2019.01) |
| G06Q 30/02 | (2023.01) |
| G06F 40/143 | (2020.01) |
| G06N 3/086 | (2023.01) |
| G06F 3/0484 | (2022.01) |
| G06F 11/36 | (2006.01) |
| G06N 3/126 | (2023.01) |
| G06F 9/451 | (2018.01) |
| G06F 8/36 | (2018.01) |
| G06N 3/06 | (2006.01) |

(52) U.S. Cl.
CPC .......... *G06F 16/2379* (2019.01); *G06F 16/26* (2019.01); *G06F 16/958* (2019.01); *G06F 40/143* (2020.01); *G06N 3/086* (2013.01); *G06N 3/126* (2013.01); *G06Q 30/02* (2013.01); *G06F 8/36* (2013.01); *G06F 9/451* (2018.02); *G06N 3/06* (2013.01)

(56) References Cited

U.S. PATENT DOCUMENTS

| | | | |
|---|---|---|---|
| 5,343,554 | A | 8/1994 | Koza et al. |
| 5,568,590 | A | 10/1996 | Tolson |
| 5,761,381 | A | 6/1998 | Arci et al. |
| 5,867,397 | A | 2/1999 | Koza et al. |
| 5,970,487 | A | 10/1999 | Shackleford et al. |
| 6,088,690 | A | 7/2000 | Gounares et al. |
| 6,523,016 | B1 | 2/2003 | Michalski |
| 6,957,200 | B2 | 10/2005 | Buczak et al. |
| 7,016,882 | B2 | 3/2006 | Afeyan et al. |
| 7,035,740 | B2 | 4/2006 | Kermani |
| 7,047,169 | B2 | 5/2006 | Pelikan et al. |
| 7,353,184 | B2 | 4/2008 | Kirshenbaum et al. |
| 7,356,518 | B2 | 4/2008 | Bonabeau et al. |
| 7,444,309 | B2 | 10/2008 | Branke et al. |
| 7,603,326 | B2 | 10/2009 | Bonabeau et al. |
| 7,624,077 | B2 | 11/2009 | Bonabeau et al. |
| 7,707,220 | B2 | 4/2010 | Bonabeau et al. |
| 7,882,048 | B2 | 2/2011 | Bonabeau et al. |
| 8,117,139 | B2 | 2/2012 | Bonabeau et al. |
| 8,117,140 | B2 | 2/2012 | Bonabeau et al. |
| 8,423,323 | B2 | 4/2013 | Bonabeau |
| 8,775,341 | B1 | 7/2014 | Commons |
| 8,805,715 | B1 | 8/2014 | Jones et al. |
| 8,868,446 | B2 | 10/2014 | Lamoureux et al. |
| 9,002,729 | B2 | 4/2015 | Natoli et al. |
| 9,008,416 | B2 | 4/2015 | Movellan et al. |
| 9,104,978 | B2 | 8/2015 | Zeine et al. |
| 9,311,383 | B1 | 4/2016 | Karty et al. |
| RE46,178 | E | 10/2016 | Afeyan et al. |
| 9,792,205 | B2 | 10/2017 | Young |
| 10,503,529 | B2 | 12/2019 | Lopushenko et al. |
| 10,783,429 | B2 * | 9/2020 | Miikkulainen ....... G06F 40/143 |
| 2002/0082077 | A1 | 6/2002 | Johnson et al. |
| 2003/0191731 | A1 | 10/2003 | Stewart et al. |
| 2004/0024888 | A1 | 2/2004 | Davis et al. |
| 2004/0025109 | A1 | 2/2004 | Harrington et al. |
| 2004/0122785 | A1 | 6/2004 | Brown et al. |
| 2004/0143559 | A1 | 7/2004 | Ayala |
| 2006/0103667 | A1 | 5/2006 | Amit et al. |
| 2006/0225003 | A1 | 10/2006 | Agogino et al. |
| 2007/0094072 | A1 | 4/2007 | Vidals et al. |
| 2007/0094168 | A1 | 4/2007 | Ayala et al. |
| 2007/0100688 | A1 | 5/2007 | Book |
| 2007/0239632 | A1 | 10/2007 | Burges et al. |
| 2007/0298866 | A1 | 12/2007 | Gaudiano et al. |
| 2007/0300185 | A1 | 12/2007 | Macbeth et al. |
| 2008/0027924 | A1 | 1/2008 | Hamilton et al. |
| 2008/0082362 | A1 | 4/2008 | Haider |
| 2008/0209320 | A1 | 8/2008 | Mawhinney et al. |
| 2008/0275980 | A1 | 11/2008 | Hansen |
| 2009/0030859 | A1 | 1/2009 | Buchs et al. |
| 2009/0125370 | A1 | 5/2009 | Blondeau et al. |
| 2009/0259534 | A1 | 10/2009 | Utter et al. |
| 2009/0327913 | A1 | 12/2009 | Adar et al. |
| 2010/0169234 | A1 | 7/2010 | Metzger et al. |
| 2011/0179370 | A1 | 7/2011 | Cardno et al. |
| 2011/0214077 | A1 | 9/2011 | Singh et al. |
| 2011/0261049 | A1 | 10/2011 | Cardno et al. |
| 2012/0022938 | A1 | 1/2012 | McNea et al. |
| 2012/0089544 | A1 | 4/2012 | Zeine et al. |
| 2012/0130929 | A1 | 5/2012 | Cantin |
| 2012/0303564 | A1 | 11/2012 | Dobson et al. |
| 2013/0024290 | A1 | 1/2013 | Berg |
| 2013/0124440 | A1 | 5/2013 | Hodjat et al. |
| 2013/0179434 | A1 | 7/2013 | Sanghavi et al. |
| 2013/0218821 | A1 | 8/2013 | Szatmary et al. |
| 2013/0254036 | A1 | 9/2013 | Trinh et al. |
| 2013/0282626 | A1 | 10/2013 | White et al. |
| 2014/0067514 | A1 | 3/2014 | Vitti et al. |
| 2014/0067516 | A1 | 3/2014 | Price et al. |
| 2014/0075004 | A1 | 3/2014 | Van Dusen et al. |
| 2014/0075336 | A1 | 3/2014 | Curtis et al. |
| 2014/0189714 | A1 | 7/2014 | Lawbaugh et al. |
| 2014/0236875 | A1 | 8/2014 | Phillipps et al. |
| 2014/0279203 | A1 | 9/2014 | Malek et al. |
| 2014/0321737 | A1 | 10/2014 | Movellan et al. |
| 2014/0344013 | A1 | 11/2014 | Karty et al. |
| 2014/0372344 | A1 | 12/2014 | Morris et al. |
| 2015/0006442 | A1 | 1/2015 | Ogilvie et al. |
| 2015/0019173 | A1 | 1/2015 | Amid et al. |
| 2015/0039416 | A1 | 2/2015 | Sullivan et al. |
| 2015/0074641 | A1 | 3/2015 | Nambiar et al. |
| 2015/0095756 | A1 | 4/2015 | Aganovic et al. |
| 2015/0254328 | A1 | 9/2015 | Dereszynski et al. |
| 2015/0363302 | A1 | 12/2015 | Young |
| 2016/0269237 | A1 | 9/2016 | Higgins et al. |
| 2016/0321716 | A1 | 11/2016 | Ravikant et al. |
| 2017/0124600 | A1 | 5/2017 | Katzen et al. |
| 2017/0132553 | A1 | 5/2017 | Theirl et al. |
| 2017/0193366 | A1 * | 7/2017 | Miikkulainen ......... G06F 16/26 |
| 2017/0193367 | A1 | 7/2017 | Miikkulainen et al. |
| 2017/0300966 | A1 | 10/2017 | Dereszynski et al. |
| 2019/0205020 | A1 | 7/2019 | Fairbanks |

FOREIGN PATENT DOCUMENTS

| | | |
|---|---|---|
| JP | 2003529116 A | 9/2003 |
| WO | 0002138 A1 | 1/2000 |
| WO | 0058878 A2 | 10/2000 |

OTHER PUBLICATIONS

"Look Inside a 1,024 Recipt Multivariate Experiment", Aug. 13, 2009, 3 pages.

"Product Integration Testing at the Speed of Netflix", Jul. 5, 2016, 12 pages, [Retrieved Oct. 4, 2016]. Retrieved from the Internet <URL: http://techblog.netflix.com/search/label/A%2FB%20Testing>.

Nesamoney, Diaz, "Personalized Digital Advertising", 2015, cover page through p. 6 and Index, 34 pages.

Saint-Amant, Chris, "Netflix Scaling A/B Testing on Netflix.com with Node.js", Aug. 18, 2014, 8 pages.

PCT/IB17/050043—International Search Report and Written Opinion dated May 24, 2017, 28 pages.

PCT/IB17/050044—International Search Report and Written Opinion dated Jun. 1, 2017, 21 pages.

U.S. Appl. No. 15/399,433—Office Action dated Aug. 30, 2018, 29 pages.

Shrivastava, et al., "A Review on Web Recommendation System", International Journal of Computer Applications (0975-8887) vol. 83—No. 17, Dec. 2013, pp. 14-17.

(56) References Cited

OTHER PUBLICATIONS

PCT/IB17/050044—International Preliminary Report on Patentability dated Jul. 19, 2018, 11 pages.
PCT/IB17/050043—International Preliminary Report on Patentability dated Jul. 19, 2018, 8 pages.
EP 17735902.3—Voluntary Amendments filed Feb. 18, 2019, 20 pages.
EP 17735903.1—Voluntary Amendments filed Feb. 15, 2019, 22 pages.
U.S. Appl. No. 15/399,433—Preliminary Amendment dated Jan. 3, 2018, 7 pages.
U.S. Appl. No. 15/399,433—Response to Office Action dated Aug. 30, 2018, filed Feb. 28, 2019, 11 pages.
U.S. Appl. No. 15/399,433—Notice of Allowance dated Apr. 3, 2019, 19 pages.
CN 201780015049.6—Voluntary Amendment filed Apr. 26, 2019, 20 pages.
U.S. Appl. No. 15/399,450—Office Action dated Jul. 30, 2019, 51 pages.
EP 17735902.3—Search Report dated Aug. 2, 2019, 10 pages.
Tamburrelli et al., "Towards Automated A/B Testing", Aug. 26, 2014, International Conference on Computer Analysis of Images and Patterns. CAIP 2017: Computer Analysis of Images and Patterns; [Lecture notes in Computer Science; Lect. Notes Computer], Springer, Berlin, Heidelberg, pp. 184-198, XP047297313, ISBN: 978-3-642-17318-9.
EP 17735903.1—Search Report dated Aug. 2, 2019, 12 pages.
U.S. Appl. No. 15/399,520—Office Action dated Nov. 15, 2019, 13 pages.
U.S. Appl. No. 15/399,523—Notice of Allowance dated Jan. 10, 2020, 23 pages.
U.S. Appl. No. 15/399,450—Response to Office Action dated Jul. 30, 2019 filed Dec. 30, 2019, 17 pages.
EP 17735902.3—Response to Rule 70(2) and Search Report dated Aug. 21, 2019 filed Feb. 6, 2020, 19 pages.
IL 260372—First Office Action dated Feb. 23, 2020, 4 pages.
U.S. Appl. No. 15/399,450—Office Action dated Apr. 15, 2020, 53 pages.
U.S. Appl. No. 15/399,523—Notice of Allowance dated May 20, 2020, 19 pages.
U.S. Appl. No. 15/399,520—Response to Office Action dated Nov. 15, 2019, filed Feb. 13, 2020, 8 pages.
U.S. Appl. No. 15/399,520—Notice of Allowance dated May 28, 2020, 10 pages.
Baveye, "Automatic Prediction of Emotions Induced by Movies", Doctoral Thesis, University of Lyon, 2015, pp. 1-162.
U.S. Appl. No. 15/399,450—Response to Office Action dated Apr. 15, 2020, filed Jun. 2, 2020, 13 pages.
U.S. Appl. No. 15/399,520—Notice of Allowance dated Oct. 16, 2020, 20 pages.
U.S. Appl. No. 15/399,450—Office Action dated Jan. 22, 2021, 54 pages.
CN 201780015049.6—First Office Action dated Aug. 17, 2020, 9 pages (including 4 pages of English translation).
CN 201780015049.6—Response to First Office Action filed Dec. 31, 2020, 15 pages (including 6 pages of English translation).
Giordano Tamburrelli et al., "Towards Automated A/B Testing", ResearchGate, Aug. 4, 2014, https://www.researchgate.net/publication/264435539, retrieved on Feb. 3, 2021, 16 pages.
JP 2018-553336, First Office Action dated Feb. 24, 2021, 8 pages.
IL 260372—Response to First Office Action dated Feb. 23, 2020 filed Jun. 21, 2020, 46 pages.
IL 260372—Notice of Allowance dated Dec. 20, 2020, 8 pages.
U.S. Appl. No. 15/399,520—Notice of Allowance dated Mar. 9, 2021, 11 pages.
CN 201780015049.6—Notice of Allowance, dated Apr. 7, 2021, 4 pages.
U.S. Appl. No. 15/399,450—Office Action dated Jul. 16, 2021, 47 pages.
JP 2018-553336 Response to First Office Action dated Feb. 24, 2021, filed Aug. 24, 2021, 11 pages.
AU 2017205231—First Examination Report dated Jun. 23, 2021, 5 pages.
U.S. Appl. No. 15/399,450—Response to Office Action dated Jul. 16, 2021, filed Dec. 16, 2021, 14 pages.
U.S. Appl. No. 15/399,450—Response to Office Action dated Jan. 22, 2021, filed Apr. 22, 2021, 15 pages.
JP 2018-553336 Notice of Allowance, dated Oct. 26, 2021, 5 pages.
CA 3,010,803—Office Action dated Jan. 31, 2022, 2 pages.
AU 2017205231—Response to First Examination Report dated Jun. 23, 2021 filed Apr. 12, 2022, 99 pages.
CA 3,010,803—Response to Office Action dated Jan. 31, 2022 filed May 31, 2022, 8 pages.
AU 2017205231—Notice of Allowance, dated Apr. 19, 2022, 3 pages.

* cited by examiner

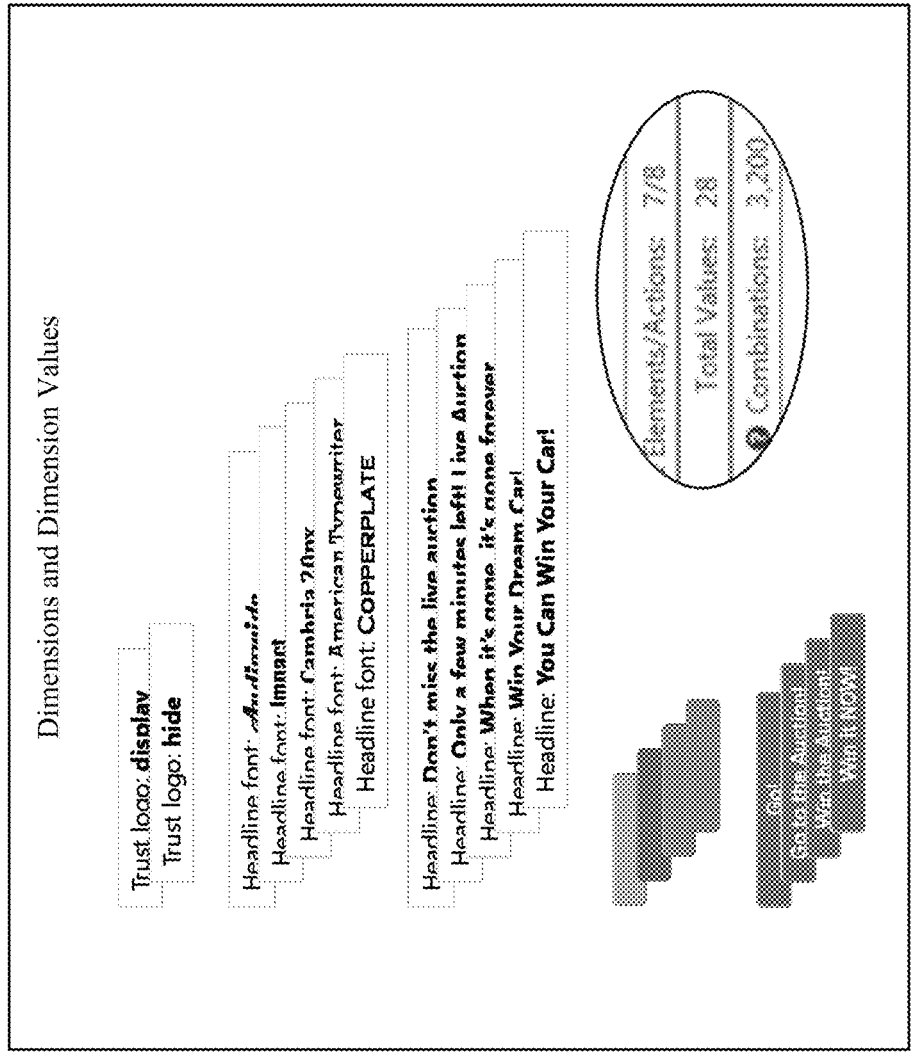
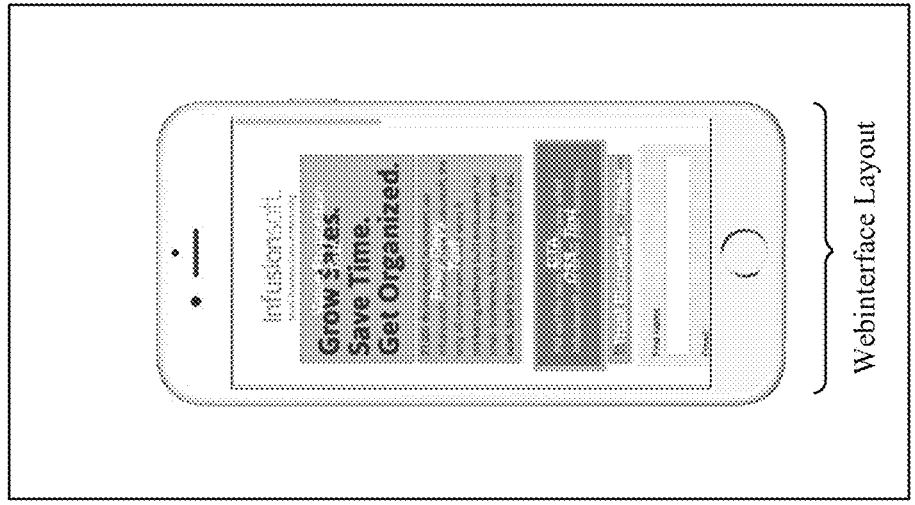
FIG. 5

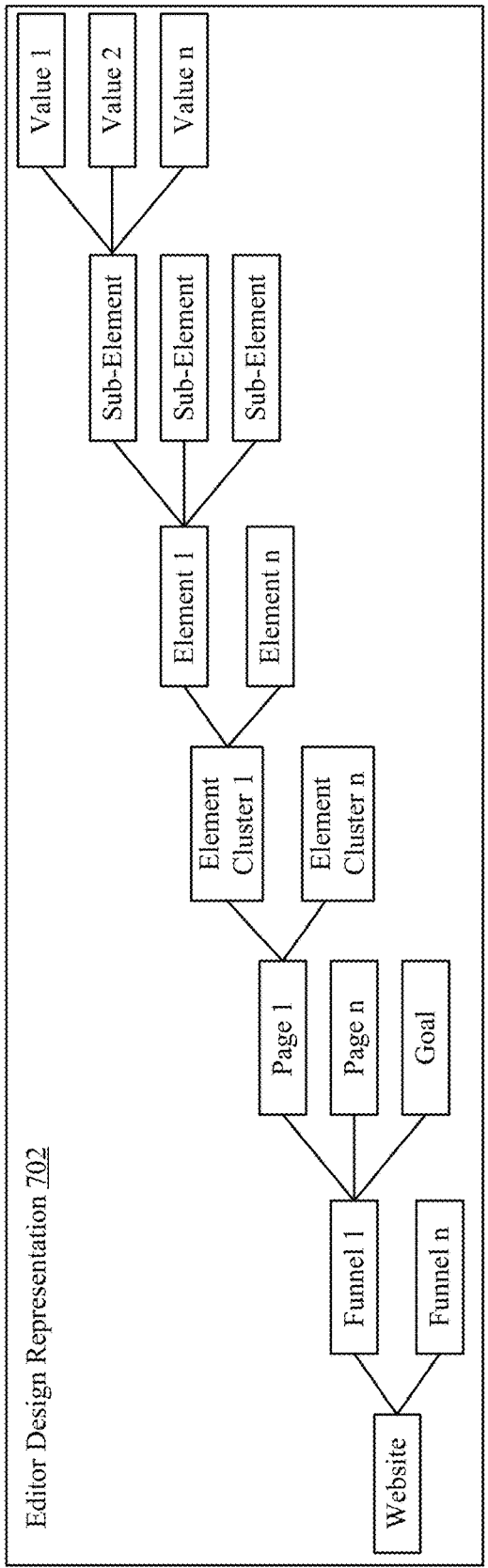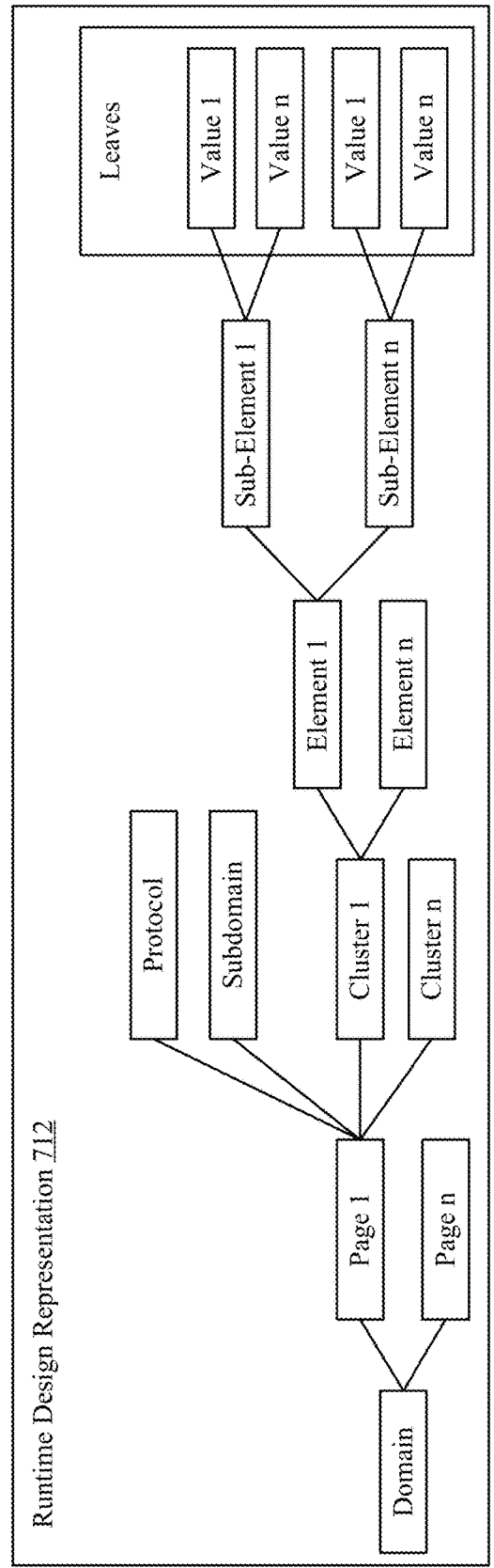
FIG. 7

OUTPUT LAYER DESIGN EXAMPLES & INTERPRETATION SCHEMES

| Clusters 802 | Elements 804 | Sub-Elements 806 | Values 808 | Encoding 810 |
|---|---|---|---|---|
| | Logo | Text / Formatting | Control / Value 1 | [ [[0, 1]], |
| | Main Headline | Text / Formatting | Control / Value 1 / Value 2 / Value 3 | [0, 0, 1, 0]], |
| | Sub Headline | Text / Formatting | Control / Value 1 / Value 2 / Value 3 / Value 4 | [0, 0, 0, 1, 0]], |
| | Call-to-Action | Text / Formatting | Control / Value 1 | [ [[ 1, 0], |
| Sub Headline & Call-to-Action | | | Control / Value 1 | [0, 1]], |
| | | | Control / Value 1 | [[ 1, 0], |
| | | | Control / Value 1 | [0, 1]] ] |

FIG. 8

WEBINTERFACE PRESENTATION USING ARTIFICIAL NEURAL NETWORKS

PRIORITY DATA AND CROSS REFERENCE TO OTHER APPLICATIONS

This application is a continuation of U.S. patent application Ser. No. 15/399,523, entitled "WEBINTERFACE PRODUCTION AND DEPLOYMENT USING ARTIFICIAL NEURAL NETWORKS," filed Jan. 5, 2017, which claims the benefit of U.S. Provisional Patent Application 62/275,058, "AUTOMATED CONVERSION OPTIMIZATION SYSTEM AND METHOD USING MACHINE LEARNING", filed on Jan. 5, 2016; and U.S. Provisional Patent Application 62/275,074, "AUTOMATED SEGMENTATION/PERSONALIZATION CONVERSION OPTIMIZATION USING MACHINE LEARNING", filed on Jan. 5, 2016. The priority provisional and non-provisional applications are hereby incorporated by reference.

This application-incorporates by reference U.S. Nonprovisional patent application Ser. No. 15/399,433, entitled "MACHINE LEARNING BASED WEBINTERFACE GENERATION AND TESTING SYSTEM", filed Jan. 5, 2017;

This application incorporates by reference US Nonprovisional Patent Application Ser. No. 15/399,450, entitled "MACHINE LEARNING BASED WEBINTERFACE PRODUCTION AND DEPLOYMENT SYSTEM", filed Jan. 5, 2017; and This application incorporates by reference US Nonprovisional Patent Application Ser. No. 15/399,520, entitled "WEBINTERFACE GENERATION AND TESTING USING ARTIFICIAL NEURAL NETWORKS", filed Jan. 5, 2017.

FIELD OF THE TECHNOLOGY DISCLOSED

The technology disclosed relates generally to webinterface generation and testing using artificial intelligence and artificial neural networks, and in particular relates to providing so-called machine-learned conversion optimization (MLCO) solutions using evolutionary computations.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed provides a so-called machine-learned conversion optimization (MLCO) system that uses artificial neural networks and evolutionary computations to efficiently identify most successful webpage designs in a search space without testing all possible webpage designs in the search space. The search space is defined based on webpage designs provided by marketers. Neural networks are represented as genomes. Neural networks map user attributes from live user traffic to different dimensions and dimension values of output funnels that are presented to the users in real time. The genomes are subjected to evolutionary operations like initialization, testing, competition, and procreation to identify parent genomes that perform well and offspring genomes that are likely to perform well.

Common methods for running controlled experiments on websites include sophisticated conversion optimization solutions. Conversion optimization includes testing multiple combinations and variations of webpages and page elements at the same time. For example, two alternative images, plus two alternative headlines, plus two copy text alternatives, for a total of twenty-seven possible combinations (including the original control versions) may be provided. Thus, conversion optimization introduces a rather complex set of permutations and combinations that need to be analyzed to determine the most effective combination of page elements that truly engage the users.

As Big Data plays a more important role in web personalization, the number of data signals, the complexity of rules, and the sheer number of outcomes has increased exponentially. As that happens, human optimization simply cannot be done except perhaps after the fact, where there is little to no opportunity to impact the outcome. Algorithmic optimization is required, but even there, simple linear regression algorithms that can handle linear relationships and correlations may not be able to sufficiently create improved outcomes, given the vast number of data inputs and resulting measurements that have to be processed to predict performance.

Machine learning systems are utilized to run tests where many variables with very complex relationships between them are involved in determining outcomes. Machine learning systems typically attempt to learn from the data to figure out the formula, rather than to try to figure out a formula to begin with, given that the relationships between the variables may be too complex to determine the algorithm in advance. Therefore, with so many variables at play in conversion optimization, very sophisticated algorithms are desirable that utilize machine learning, artificial intelligence, and other non-linear algorithms to make predictions about outcomes based on learning from large data sets of inputs.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 5 depicts a webinterface layout of a funnel that is used to initialze an output layer of a neural network represented by a genome.

FIG. 7 is a symbolic drawing of one implementation of transforming an editor design representation of a starter funnel into a runtime design representation.

FIG. 8 depicts a symbolic drawing of one implementation of encoding an output layer of a neural network represented by a genome.

DETAILED DESCRIPTION

Figure 1:
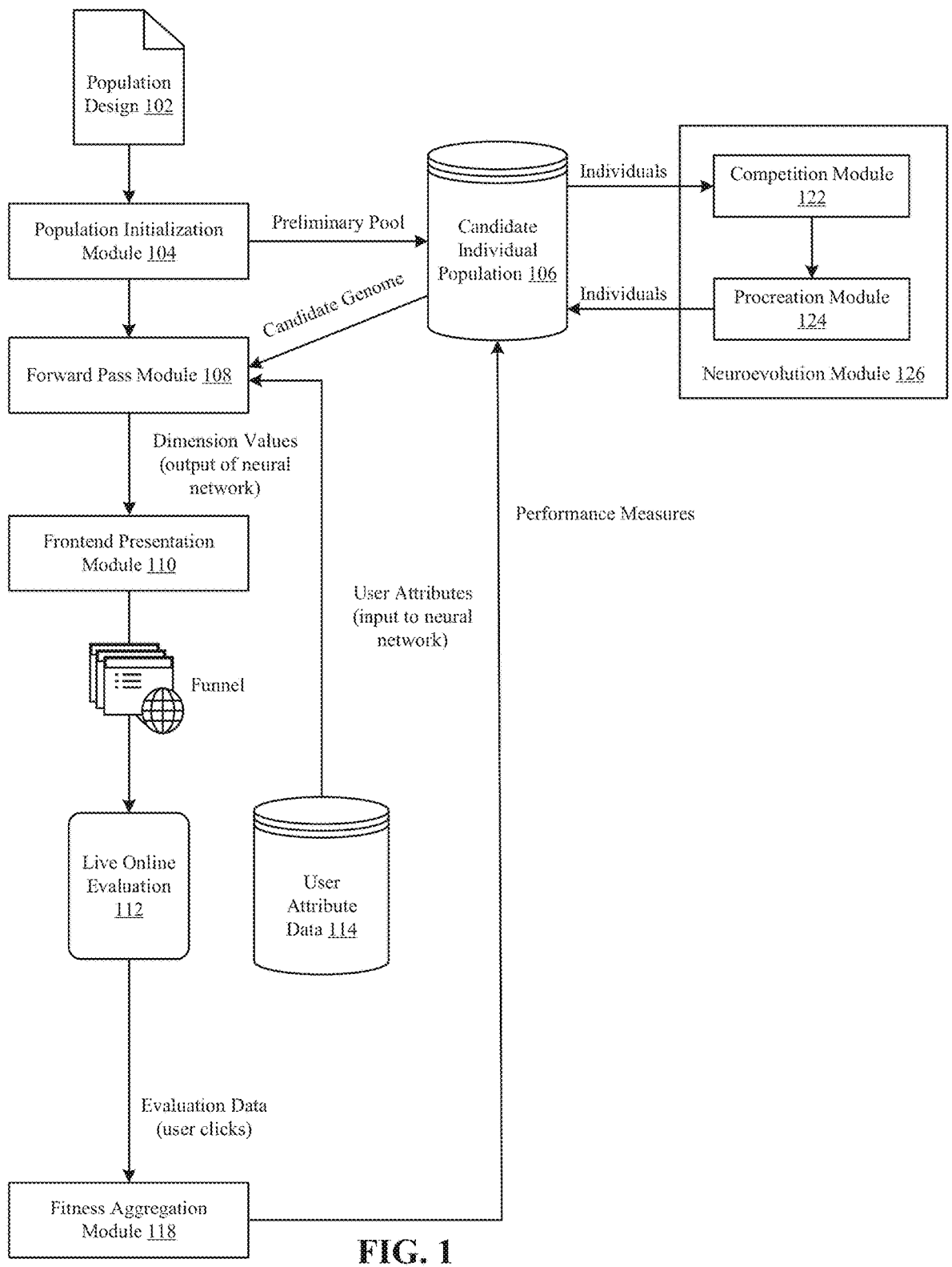
FIG. 1 illustrates aspects of a machine-learned conversion optimization (MLCO) system for promoting target online user behavior.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Examples of systems, apparatus, and methods according to the disclosed implementations are described in a conversion optimization context. In other instances, the technology disclosed can be applied to multivariate testing, AB testing, landing page optimization, conversion rate optimization, website testing, website optimization, search engine optimization, information technology, telecommunications systems, financial systems, security trading, banking, business intelligence, marketing, medical and health sciences, mining, energy, etc. Other services are possible, such that the following examples should not be taken as definitive or limiting either in scope, context, or setting.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a Big-Table™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™.

As used herein, the term "database" does not necessarily imply any unity of structure. For example, two or more separate databases, when considered together, still constitute a "database" as that term is used herein. In some implementations, the database can store information from one or more tenants into tables of a common database image to form an on-demand database service (ODDS), which can be implemented in many ways, such as a multi-tenant database system (MTDS). A database image can include one or more database objects. In other implementations, the database can be a relational database management system (RDBMS), object oriented database management system (OODBMS), distributed file system (DFS), no-schema database, or any other data storing system or computing device.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

As used herein, a given signal, event or value is "in dependence upon" a predecessor signal, event or value of the predecessor signal, event or value influenced by the given signal, event or value. If there is an intervening processing element, step or time period, the given signal, event or value can still be "in dependence upon" the predecessor signal, event or value. If the intervening processing element or step combines more than one signal, event or value, the signal output of the processing element or step is considered "in dependence upon" each of the signal, event or value inputs. If the given signal, event or value is the same as the predecessor signal, event or value, this is merely a degenerate case in which the given signal, event or value is still considered to be "in dependence upon" or "dependent on" or "based on" the predecessor signal, event or value. "Responsiveness" of a given signal, event or value upon another signal, event or value is defined similarly.

As used herein, "concurrently" or "in parallel" does not require exact simultaneity. It is sufficient if the evaluation of one of the individuals begins before the evaluation of another of the individuals completes.

As used herein, the term "funnel" refers to a frontend of the output of a neural network represented by a genome, which is perceivable, operable, and understandable by end users. In implementations, a funnel invites user interaction and responds to it. A funnel comprises one or more webinterfaces. Some examples of webinterfaces include, both control versions and variations of, webpages, websites, e-mails, mobile applications, desktop applications, digital advertisements, social media messages (e.g., Tweet™, Facebook Post™) social media feed items, social media profiles, social media accounts, social media chat messages, generic chat messages, forms, auto-filled forms, and so on.

In implementations of the technology disclosed, a funnel is implemented in or across one or more Internet accessible data centers such as a website (a set of funnels), together with associated applications running behind the website. End users operate Internet-accessible client devices or clients (e.g., desktop computers, notebook computers, tablets, mobile devices, phones or other devices having rendering engines, or the like) that are capable of accessing and interacting with the funnel. In one implementation, the end users access the funnel by opening a web browser or a mobile application. In some implementations, the end users may authenticate to the funnel (or some portion thereof).

In implementations of the technology disclosed, a webinterface is a structured document whose structure is dependent upon the underlying format. For example, in one implementation, a webinterface has a web-supported format based on Hyper Text Markup Language (HTML), Extensible Markup Language (XML), or other web-supported structured document. The webinterface may include one or more resources (e.g., a JavaScript resource, a Cascading Style Sheet (CSS) resource, an Asynchronous and JavaScript XML (AJAX) resource, an image resource, a video resource, etc.), or, more typically, references to such resources, embedded within the webinterface. By way of example, a resource embedded in the web interface may generally be included or specified within a script element, style element, image element, or object element, among others, depending on the type of resource. Typically, a web browser or other client application executing at the client device of the end user constructs a document object model (DOM) representation of the received web interface.

In another implementation, the webinterface has an e-mail format based on plain text, rich text, or HTML (with or without a style definition format such as CSS or scripting instructions in a format such as JavaScript, e.g., Microsoft Outlook™, Google Gmail™, Apple Mail™, iOS Mail™, Thunderbird™, AOL Mail™, Yahoo Mail™, Windows Live™). In yet other implementations, the webinterface has a mobile application format based on HTML5, native formats (e.g., iOS™ or Android™), and hybrid formats.

Any other conventional or future-developed structured documents or formats thereof or used therein, are considered to be webinterfaces. Such implementations will be readily apparent to those skilled in the art without departing from the spirit and scope of the technology disclosed (such as audio and haptic presentations of webinterfaces).

The webinterface (e.g., webpages, websites, e-mails, mobile applications, desktop applications, digital advertisements) comprises page elements. Some examples of page elements include images, videos, animations, headline, heading, calls-to-action, text copies, form length, and others. In one example, the calls-to-action define what happens when a user clicks or taps on any part of the webinterface. The page elements of the webinterface are arranged in a so-called webinterface layout. A webinterface layout defines the positioning of the page elements of the webinterface relative to each other. For example, an image might be at the bottom right and a video in the center of the webinterface layout. In the webinterface, all the interchangeable page elements are described using the webinterface layout, which describes how the page elements are supposed to appear relative to each other and how they are supposed to interact with each other. Each page element has several properties. For example, image page elements have properties related to type, placement, and size; calls-to-action have properties related to color, text, size, and placement; and text copies have properties related to content, length, and size.

Introduction

The technology disclosed provides a so-called machine-learned conversion optimization (MLCO) system that uses artificial neural networks and evolutionary computations to efficiently identify most successful webpage designs in a search space without testing all possible webpage designs in the search space. The search space is defined based on webpage designs provided by marketers. Neural networks are represented as genomes. Neural networks map user attributes from live user traffic to different dimensions and dimension values of output funnels that are presented to the users in real time. The genomes are subjected to evolutionary operations like initialization, testing, competition, and procreation to identify parent genomes that perform well and offspring genomes that are likely to perform well.

In ecommerce, designing user experiences, i.e., webpages and interactions, which convert as many end users as possible from casual browsers to paying customers is an important goal. While there are some well-known design principles, including simplicity and consistency, there are also often unexpected interactions between elements of the page that determine how well it converts. The same element may work well in one context but not in others—it is often hard to predict the result, and even harder to decide how to improve a given page.

An entire industry has emerged to tackle these challenges; it is called conversion rate optimization, or conversion science. The standard method most practitioners use is A/B testing, i.e., designing two different version of the same page, showing them to different users, and collecting statistics on how well they each convert. This process allows incorporating human knowledge about the domain and conversion optimization into the design, and then testing their effect. After observing the results, new designs can be compared and gradually improved. The A/B testing process is difficult and time-consuming: Only a very small fraction of page designs can be tested in this way, and subtle interactions in the design may simply be missed completely.

The technology disclosed automatically generates webpage candidates to be tested from the variables and variable values marketers themselves create. The variables and variable values can be anything on a website, from small changes like button color and font weight to whole-scale messaging and design specifications. These variables can all be on a single page or across multiple pages in a funnel. To provide user personalization, for a given set of user attributes, the technology disclosed searches for the most successful variables and variable values in a vast space of possible combinations of the values. The technology disclosed learns over time which combinations of elements are effective for which users, and gradually focuses the search around the most promising designs.

The technology disclosed is an automated system for conversion optimization, capable of testing vastly more ideas in shortened time frames. It finds the subtle combinations of variables that lead to conversion increases. The technology disclosed can discover designs that convert better than those designed by humans, often because it finds unexpected interactions between elements. For instance, the technology disclosed can find that the button needs to be green, but only when it is transparent and the header is in small font and the header text is aligned. Such interactions often do exist, and they can be very difficult to find. The technology disclosed makes this discovery process automatic, based on artificial intelligence, instead of extensive human effort. With the technology disclosed, it is thus possible to optimize conversions better and at a much larger scale than before—and keep optimizing them as the e-commerce conditions change.

Machine-Learned Conversion Optimization (MLCO) System

FIG. 1 illustrates aspects of a machine-learned conversion optimization (MLCO) system for promoting target online user behavior. In an implementation, the target behavior is conversion, but in other implementations other behavior can be targeted.

The system of FIG. 1 includes a memory storing a candidate database 106 having a population of candidate "individuals". The memory 106 is considered herein to be accessible to the system, whether it is physically part of the system or merely reachable over a network. An "individual" includes a "genome" which represents, typically in an encoded fashion, a particular neural network which is to be tested for its success in achieving the target user behavior. Examples of a neural network include a multilayer perceptron, a feed-forward neural network, a recurrent or recursive neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, echo state network, liquid state machine, highway network, LSTM (long short-term memory) network, gated recurrent unit (GRU), pre-trained and frozen neural networks, and so on.

In the implementation of FIG. 1, all of the neural networks to be tested are fully connected, and have a fixed number of neurons in the input layer and a fixed number of neurons in the output layer. Thus values for these parameters need not be specified in an individual. Each individual does specify values for other hyperparameters of the neural network, such as the number of hidden layers of the network, the number of neurons in each hidden layer, and their interconnection weights. Thus the hyperparameters of an individual describe the topology of a neural network and the coefficients for its interconnects. The hyperparameters are the values that are evolved during procreation in the system of FIG. 1, and thus represent the genome of the individual. Each individual also identifies other information, such as a current fitness estimate of the individual.

A sample set of hyperparameters according to one implementation includes the following:

| Topology Hyperparameters | Operational Hyperparameters |
| --- | --- |
| For a fully-connected neural network module: the number of neurons in each neuron layer, the number of neuron layers, and the connections among the neurons from one neuron layer to the next. For a convolutional neural network module: kernel size, number of kernels, kernel depth, kernel stride, kernel padding, activation pooling, sub sampling, pooling, and normalization. For an image preprocessing module: image shift, translation, and flipping. | Learning rate, learning rate decay, momentum, weight initialization, regularization strength, initialization deviation, input initialization deviation, Hue shift, saturation scale, saturation shift, value scale, value shift, pixel dropout, pixel dropout, L2 weight decay, and fully-connected layer drop out. |

Returning to FIG. 1, the neural network identified by an individual defines a mapping of certain user attributes (provided at the input nodes) to a respective funnel having one or more webinterfaces. In one implementation, a funnel is strictly linear sequence of webinterfaces, whereas in another implementation it can include branching. Each funnel has a number of "dimensions" (aspects) for which values can be assigned by the neural network. In response to a set of user attributes presented at the input nodes, the neural network generates at its output nodes a vector having a value for each of the funnel dimensions for which values can be assigned.

Each funnel has a mechanism by which achievement of a target user behavior can be detected. In one implementation, the target user behavior is conversion by end users. For each funnel, conversion can be detected based on a conversion goal defined by a designer, marketer, advertiser, or content creator. Examples of a conversion goal include a user reaching a specific webinterface of a funnel (e.g., a thank you page), a user clicking a link or button or other user interface element on a webinterface of a funnel, or any other custom event defined by the designer (e.g., using j Query). Other examples of a conversion goal include a user clicking a "Buy Now" button on Amazon.com™, a user clicking a "Sign Up" button on an e-mail registration page, a user clicking a "Download Now" button on an application landing page, a user filling out a form to download a report, a user signing up for a webinar, a user completing a purchase process, a user adding an item to a shopping cart, a user initializing a shopping cart checkout, and a user making a pledge to read a book. The conversion goals can be different for different funnels and different testing environments.

The funnel dimension values output by the neural network of a particular individual represent the funnel in an encoded fashion. A set of rules, sometimes referred to herein as a presentation database, defines the mapping from the funnel dimension values to the actual images and interactions to be experienced by the user. For example, one group of five neural network output nodes might be designated to select one of five choices for the text of the main headline of a particular webinterface of the funnel. A rule in the presentation database is what converts the encoded output of such node to the actual text of the headline.

Initially, in box 102 of FIG. 1, a designer specifies a design for basic aspects of the webinterface funnels that will be tested and optimized. In one implementation, this includes the number of input neurons, what user attributes they represent, the number of output neurons, their division into groups (such as the five neurons mentioned above to encode the choice of main headline text), as well as other visual and interaction elements of the funnel. Box 102 does not include specifying values for aspects of the funnel which are to be evolvable, since those will be hyperparameters and will vary among different individuals. In some implementations, however, box 102 may include specifying hyperparameters for one or more seed individuals.

In box 104, a population initialization module generates a preliminary pool of individuals and writes them into the candidate individual population 106. Each individual identifies a respective set of values for the hyperparameters of the individual. In one implementation the preliminary pool can be generated randomly, whereas in another implementation pre-specified seed individuals can be used. The reader will appreciate that many other options are possible creation of the initial population of candidate individuals.

After the candidate individual population 106 contains an initial population, a loop is begun whereby each individual in the population is tested on numerous users to estimate the fitness of the individual's neural network. The loop, which includes modules 108, 110, 112, and 118, is sometimes referred to herein as a candidate testing module 120. Preferably the neural network is tested on a wide variety of users with a wide variety of attributes, since part of what is being optimized is the consistency of the neural network's success over a wide variety of user attributes. Also, all the individuals preferably are tested roughly concurrently (though against different users), to minimize performance variations that might result from differences in the time of testing rather than differences only in the individual's neural network. For clarity of illustration, the testing of only one individual is shown in FIG. 1. It will be appreciated that multiple instances of the loop may be used in a particular implementation, one for each individual in the candidate individual population 106.

Forward pass module box 108 receives the genome (hyperparameter values) of a particular candidate individual to be tested. The forward pass module box 108 also receives the user attribute data 114, and applies it to the input nodes of the neural network specified by the received set of hyperparameters. The user attribute data describes characteristics that have been gleaned about the current user, but despite its name, need not be limited to that information. It can also include non-user-specific information such as the current day of the week. Also, while the user attribute data 114 is shown in FIG. 1 as a database, in other implementations it could come from other sources such as browser cookies, IP address, third party intelligence sources like Maxmind™. As used herein, the user attribute data 114 is considered to come generally from a "source" of user attribute data.

Examples of user attribute data that might be included in a design are site visit behavior (e.g., number of visits, time since last visit, online purchase patterns, registered user data), source for visit (e.g., referrer, ad words), device/browser, date (e.g., day-of-week, time-of-day, seasonality), connection type/ISP/cell carrier, geographic location, demographic (e.g., language (from browser/device), and other available attributes like psychographic.

The output of forward pass module box 108 is a set of dimension values for a particular funnel variation which the current candidate's neural network specifies to use given the provided user attributes. These values are provided to frontend presentation module 110, which maps them to frontend values such as the particular choice of text to use for the main headline of the third webinterface of the funnel, the particular color or CSS to use for the logo on the first webinterface of the funnel, and the particular text to use on a call-to-action in the fourth webinterface of the funnel. This funnel is then presented toward the user for live online evaluation 112. Note that since a funnel includes not only output elements such as images, but also interaction elements such as buttons and links, it will be appreciated that the term "presentation toward a user" typically involves bidirectional interaction 324 with the user.

The output of live online evaluation 112 is an indication of the success of the particular funnel variation in achieving the target user behavior in the current user session. Depending on the performance measure of the design, the output may be a binary value indicating whether or not the target user behavior was achieved, or it may be one or more values indicating an extent to which the target user behavior was achieved. For example, in a conversion optimization implementation, if the performance measure is a conversion rate, then the output of live online evaluation 112 may indicate simply yes or no, that conversion was or was not achieved in the current user session. If the performance measure is based on revenue received, then the output of live online evaluation 112 may indicate the revenue realized from the current user session. In yet another implementation, the performance measure, instead of being absolute, may be relative to a control of some sort. The control may, for example, be the performance of a fixed, unchanging control funnel, which may be used in other user sessions concurrently with those involving candidate individuals.

Fitness aggregation module 118 aggregates the performance measures of the current candidate individual over all of the user sessions for which the neural network of the current candidate individual was used. Aggregation may be an average, or may be some other formula for developing a combined fitness value for the individual. The aggregate performance measure is written into the candidate individual population pool 106 in association with the current candidate individual.

As mentioned, multiple instances of the loop of boxes 108, 110, 112, and 118 may be used roughly concurrently in a particular implementation, one for each individual in the candidate individual population 106. Alternatively, different individuals may be used in an interleaved manner in a single instance of the loop. Still further, a blend of these two alternatives may be used. In the end, though, all of the individuals to be tested are tested in multiple user sessions so that a reasonably accurate estimate of the individual's fitness can be obtained for each of them. In an example, the candidate individual population pool 106 may contain 50 individuals, and each one of them undergoes a battery of 1000-2000 trials (user sessions).

Also shown in FIG. 1 is a neuroevolution module 126. After all of the individuals being tested from the candidate individual population 106 have been tested in a full battery of user sessions, neuroevolution module 126 evolves them to form a new generation of individuals.

Neuroevolution module 126 comprises a competition module 122. In one implementation, the evolutionary computations utilize a competition module 222, which is operationalized in certain generations. The competition module 122 updates the candidate individual population 106 contents in dependence upon the updated performance measures provided by the competition testing module 120. In some implementations, the competition module 122 discards candidate individuals that do not meet a minimum baseline individual fitness (e.g., pre-set by an administrator or automatically set), or candidate individuals whose "individual fitness" relatively lags the "individual fitness" of similarly tested candidate individuals. Population 106 is updated with the revised contents.

The competition module 122 manages graduation of candidate individuals from one generation to the next. This process can be thought of as occurring one candidate individual at a time, as follows. First, a loop is begun through all candidate individuals for whom the performance measures have been updated since the last time the competition module 122 was executed. In one implementation, if the performance measures for a current candidate individual are still below a baseline individual fitness (e.g., pre-set by an administrator or automatically set) or are sufficiently lagged relative to individual fitness of other candidate individuals, then the current candidate individual is discarded and the next one is considered. If the performance measures for the current individual are above a baseline individual fitness (e.g., pre-set by an administrator or automatically set) or are relatively on par with individual fitness of other candidate individuals, then the current candidate individual is added to the next generation. The process then moves on to consider the next candidate individual in sequence.

In one implementation, the competition module 122 evaluates candidate individual based on their "relative performance measures", instead of their absolute performance measures. A relative performance measure of a candidate individual is calculated based on the difference between an absolute performance measure of a control individual determined in a first time period and an absolute performance measure of the candidate individual also determined in the first time period. So, for example, if a first candidate individual created during a first generation has an absolute average conversion rate of 40% and a first control individual also initialized in the first generation has an absolute average conversion rate of 35%, then the relative performance measure of the first candidate individual is 5% (40%−35%=5%). Similarly, if a second candidate individual created during a second generation has an absolute average conversion rate of 45% and the first control individual's absolute average conversion rate in the second generation has increased to 42%, then the relative performance measure of the second candidate individual is 3% (45%−42%=3%). Accordingly, the first and second candidate individuals are compared based on their respective relative performance measures and the first candidate individual is found to be 2% better than the first candidate individual (5%−3%=2%), even though the absolute performance measure of the second candidate individual is 5% (45%−40%=5%) higher than that of the first candidate individual. Each comparison made by the competition module 122 between the relative performance measure of one individual and that of another is sometimes referred to herein as a comparison "instance".

In one implementation, the competition module 122 determines whether the relative performance measure of the current candidate individual exceeds that of the least fit candidate individual in the candidate individual population 106. If so, then the least fit candidate individual is discarded, and the current candidate individual is moved to the next generation. If not, then the current candidate individual is discarded. The process then moves on to consider the next candidate individual in sequence.

Neuroevolution module 126 also comprises a procreation module 124. After the candidate individual population 106 has been updated, the procreation module 124 adds to the candidate individual population new individuals formed in dependence upon a respective set of one or more parent individuals from the candidate individual population 106 and the parents' performance measures. Any conventional or future-developed technique can be used for procreation. In an implementation, conditions, outputs, or rules from parent individuals are combined in various ways to form child individuals (e.g., fitness-proportionate selection), and then, occasionally, they are mutated. The combination process for example may include crossover—i.e., exchanging conditions, outputs, or entire rules between parent individuals to form child individuals. New individuals created through procreation begin with performance measures that are indicated as undefined.

The procreation module 124 forms new individuals by evolving the hyperparameters of the neural networks. Note that the procreation module 124 does not evolve the dimension values of the output funnels. In one implementation, the procreation module 124 forms new individuals by a crossover between hyperparameter values of the parent individuals. In another implementation, the procreation module 124 forms new individuals at least in part by mutation of at least one hyperparameter value of a parent individual. Population 106 is then updated with the new individuals.

After a new generation of individuals has been written into the candidate individual population 106, the candidate testing module 120 of boxes 104, 108, 112, and 118 repeats through another battery of user session trials. Neuroevolution module 126 then evolves a third generation of candidate individuals, and so on.

If the search space for an optimum neural network is not too large, it will be appreciated that after enough generations of individuals the population may converge such that further evolution becomes pointless. In that situation, an implementation may harvest one or a few top performing individuals for deployment in all or most future user sessions. As mentioned, the fitness of an individual is partly a function of how well its neural network adjusts the funnel in response to varying sets of user attributes. Thus a very fit individual should continue to perform well over many types of users.

On the other hand, it may be beneficial to continue evolving individuals anyway, for example to take account of environmental changes that are not reflected in the user attributes provided to the neural network. For a consumer vendor's website, for example, such changes might occur on a transition into or out of the holiday buying season.

If evolution is to continue after convergence, then a number of ways will be apparent to the reader for doing so even while a harvested individual is deployed other future user sessions. As one example, the harvested individual may be interspersed with candidate individuals in use with different user sessions. In such an example, the performance of the harvested individual may be used as a control against which new candidate individuals are evaluated. Other variations will be apparent to the reader.

While the illustration of FIG. 1 includes neuroevolution, it will be appreciated that in another implementation no evolution may be necessary. For example, the module 126 may include competition module 122 in order to gradually discard poor performing individuals, but no procreation module 124 for rebuilding the population. Such a system includes the memory storing candidate individual population 106, the candidate testing module of boxes 108, 110, 112, and 118, and competition module 122. Typically the system would also continue to include population design box 102 and population initialization module 104. All other aspects of the system of FIG. 1 can remain the same.

In some implementations, the MLCO system uses an optional fulfillment system (not shown). Fulfillment system is a system that is controlled automatically by output/action signals from the candidate testing module 120. In a webpage testing environment, for example, the fulfillment system is a product distribution e-warehouse (e.g., Amazon.com™) that receives the signals via a computer network (not shown) and takes appropriate transactional and delivery actions.

Genome

Figure 2:
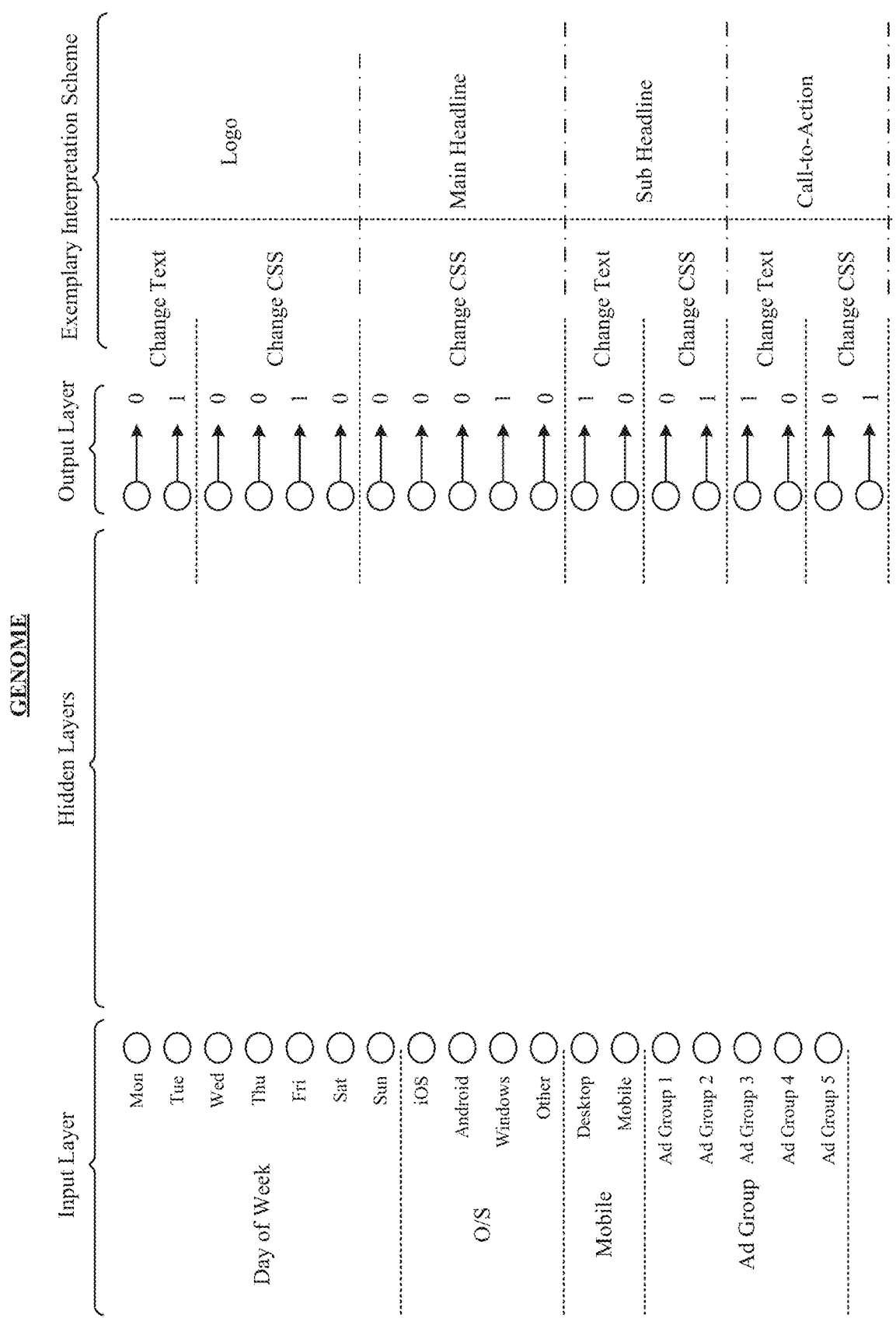
FIG. 2 illustrates one implementation of a genome that represents a neural network.

FIG. 2 illustrates one implementation of a genome that represents a neural network. The neural network includes an input layer, one or more hidden layers, and an output layer. The neuroevolution module 126 only evolves the hidden layers. The input and output layers are not evolved. The input layer takes user attribute data 114 as input, the hidden layer uses non-linearity functions and network weights to generate alternative representations of the input, and the output layer generates dimension values for an output funnel based on the alternative representations. This way the neural network maps user attribute data 114 to dimension values of an output funnel. Some examples of the non-linearity functions include sigmoid function, rectified linear units (ReLUs), hyperbolic tangent function, absolute of hyperbolic tangent function, leaky ReLUs (LReLUs), and parametrized ReLUs (PReLUs).

Input Layer Initialization

The hyperparameters of the input layer are based on user attribute data 114 and can be defined based on specifications provided by a designer, marketer, advertiser, or content creator. In the example shown in FIG. 2, the neurons of the input layer correspond to user attributes pertaining to which day of the week user activity is detected, the operating system (O/S) of user's device, the type of user's device, and the ad group through which the user was directed. In implementations, the selection of such user attributes is based on the specifications provided by the designer across interface 304 of design editor 302. In other implementations, the designer can specify other user attributes, and the system can use them accordingly to initialize the hyperparameters of the input layer (e.g., number of neurons in the input layer).

In some implementations, the user attributes specified by the designer are processed differently by the input layer. For example, instead of taking in categorical values for "day of week" as input, the input layer can be initialized to utilize a cyclical pattern over the week by having "sine, cosine" encoding. In other implementations, the input encoding of the input layer can be represented using other schemes relying on data types like binary data type (0 or 1), quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type.

Output Layer Initialization

The hyperparameters of the output layer are initialized in dependence upon a starter funnel defined by the designer. The starter funnel defines a funnel search space of all possible variations of the starter funnel that a neural network represented by a genome can output. The funnel search space is defined by subjecting the starter dimensions and starter dimension values of the starter funnel to combinatorial operations. In one example, if the designer specifies 4 starter page elements (e.g., logo, main headline, sub headline, call-to-action), 7 possible starter sub-elements, and 19 possible starter sub-element values, then a funnel search space with 640 possible combinations of dimensions and dimension values is defined by subjecting 8 different variations of the logo, 5 different variations of the main headline, 4 different variations of the sub headline, and 4 different variations of the call-to-action to combinatorial operations (i.e., 8×5×4×4=640). Depending on the input values identified by the user attribute data 114, the neural network outputs dimension values that identify a particular funnel variation in the funnel search space. Thus for different input values the neural network outputs different funnel variations.

Figure 3:
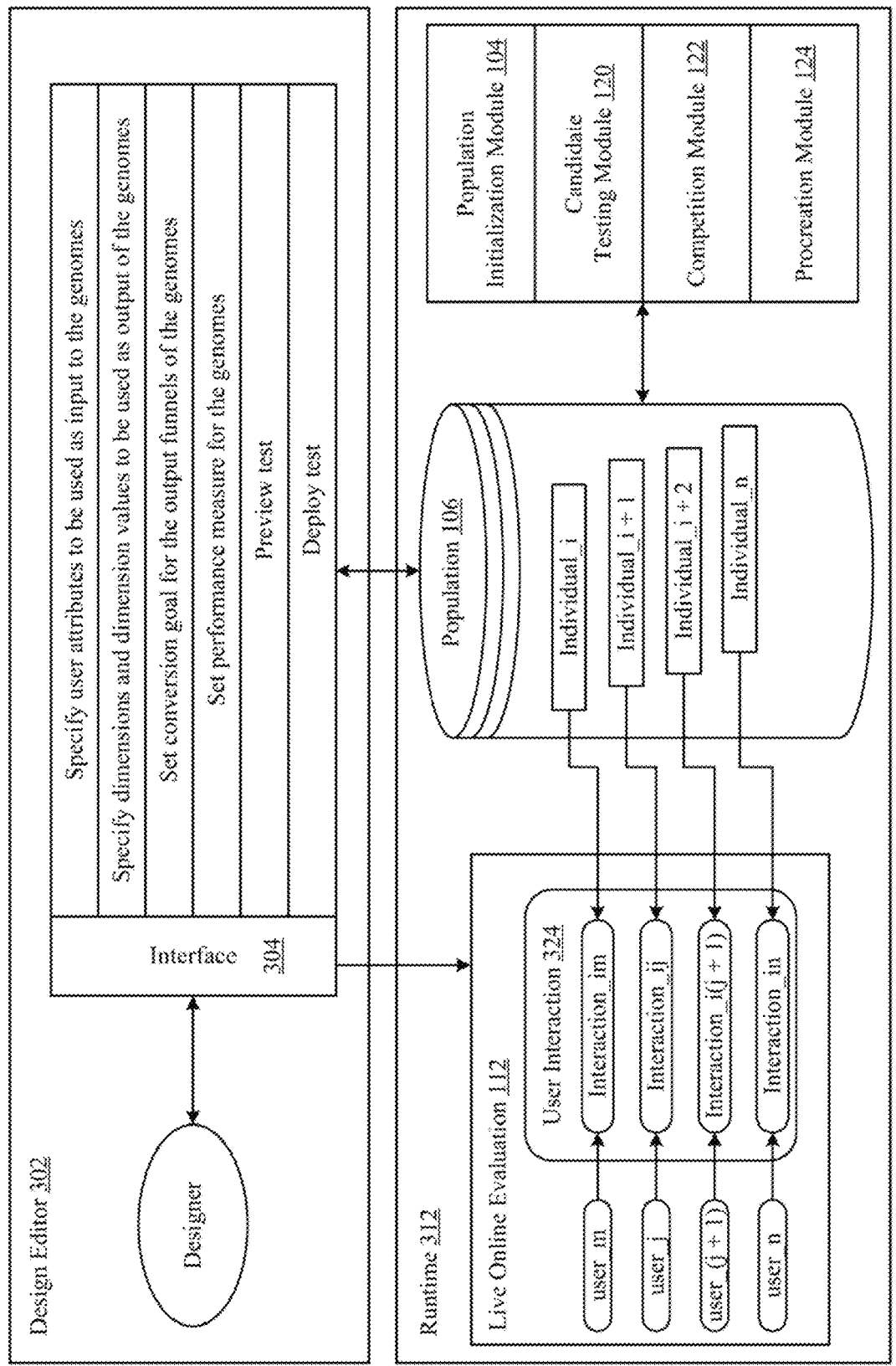
FIG. 3 shows a workflow of the disclosed machine-learned conversion optimization (MLCO).

Referring to FIG. 3, design editor 302 comprises various interface components as part of interface 304 that are used by a designer, marketer, advertiser, or content creator to implement a MLCO workflow. In particular, the design editor 302 is used by the designer to: specify user attributes to be used as input for the neural networks represented by the genomes; specify dimensions and dimension values to be used as output of the neural networks represented by the genomes; set a conversion goal for the output funnels of the neural networks represented by the genomes; set a performance measure for the neural networks represented by the genomes; preview the test; and deploy the test. The runtime environment is illustrated as 312.

Figure 4:
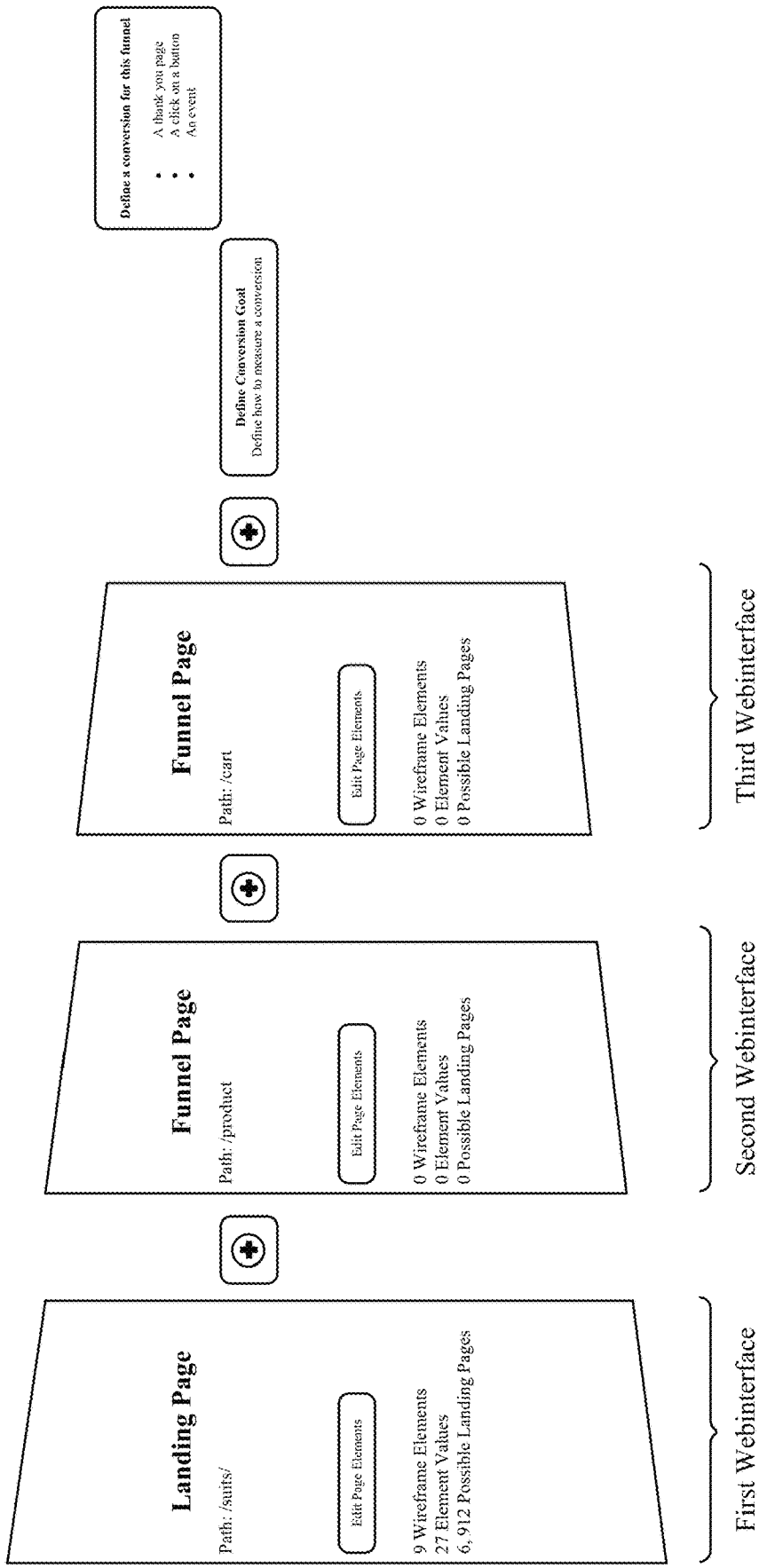
FIG. 4 illustrates a funnel with multiple webinterfaces that is used to initialze an output layer of a neural network represented by a genome.

FIG. 4 shows one implementation of a starter funnel with three starter webinterfaces (e.g., one landing page and two funnel pages). In one implementation, the starter webinterfaces are identified in the starter funnel by their respective access paths (e.g., unified resource locators (URLs), and arranged in a topological sequence. Typically, the topological sequence determines a path an end user follows through a funnel to complete a conversion goal defined for the funnel. The topological sequence is set graphically by the designer across the interface 304 and stored logically in memory.

FIG. 4 also depicts a "define conversion goal" button that allows the designer to set a conversion goal for the starter funnel. Examples of a conversion goal also include "increase leads" or "increase revenue". The designer also defines what type of events will be considered to indicate that a conversion has occurred, such as visiting a thank you page, clicking on a button or link, or a custom event. After setting the conversion goal, the designer specifies a performance measure. The performance measure is used by the MLCO system to evaluate the performance of the candidate individuals during the test, as discussed above.

Then, a webinterface layout is generated for the starter funnel. As used herein, a "webinterface layout" is merely a template within which the alternative values for dimensions are inserted in order to define a particular webinterface of a funnel. In one implementation, the webinterface layout is displayed across a simulated device selected by the designer from among options of devices with varying screen canvases (e.g., smartphones, tablets, computers, wearable devices). In some implementations, the options of devices lists different device models like iPhone6™, Samsung Galaxy S6™, and others. FIG. 5 illustrates one implementation of a webinterface layout and different dimensions and dimension values that can be applied to the webinterface layout.

Then, the designer selects different page elements (referred to herein as "starter dimensions") to be included in the webinterface layout for each of the starter webinterfaces of the starter funnel. In one implementation, the designer also specifies a type for a page element. For example, a name of the page element is "Clean, Awesome and Multi-Purpose" and the type of the page element is "Headline—Main". Advancing further, the designer defines different sub-elements (also referred to herein as "starter dimensions") for each of the starter webinterfaces of the starter funnel. Examples of sub-elements include text, formatting/CSS (Cascading Style Sheets), page element concealment, page element removal, class, HTML, custom jQuery, and image. In some implementations, the designer can activate or deactivate some of the sub-elements (e.g., using a dropdown). In one implementation, the inactive sub-elements are displayed across the interface 304 with strikethrough. In other implementations, the design editor 302 automatically makes some sub-elements active and others inactive.

Then, the designer sets sub-elements values (referred to herein as "starter dimension values") for each of the defined sub-elements. In addition, the designer also sets, for each of the defined sub-elements, a control sub-element value and one or more test sub-element values. In other implementations, the design editor 302 automatically sets a default control value for the sub-elements. For example, for the page element "Headline—Main", the control sub-element value is set to be "Clean, Awesome and Multi-Purpose" and test sub-element values are set to be "Slick, Awesome and Powerful", "New, Fast, Better", "Shiny, Better than the Competition", and "Best you can Buy". Similarly, in other implementations, different page elements and corresponding sub-elements and sub-element values can be defined as a set of starter dimensions and starter dimension values of each of the starter webinterfaces of the starter funnel.

Each webinterface of a funnel can be thought of as a point in a vector-based search space. Each dimension axis in the vector space corresponds to one of the page elements, and each different coordinate position along a given axis indicates one of the designer-specified alternatives for that page element. For example, in FIG. 5, the call-to-action dimension has four coordinate positions (values or alternatives), namely "Go!", "Go to the Auction!", "Win the Auction!", and "Win it NOW!". A particular webinterface of a funnel specifies a value for each of the page elements/dimensions.

Figure 6:
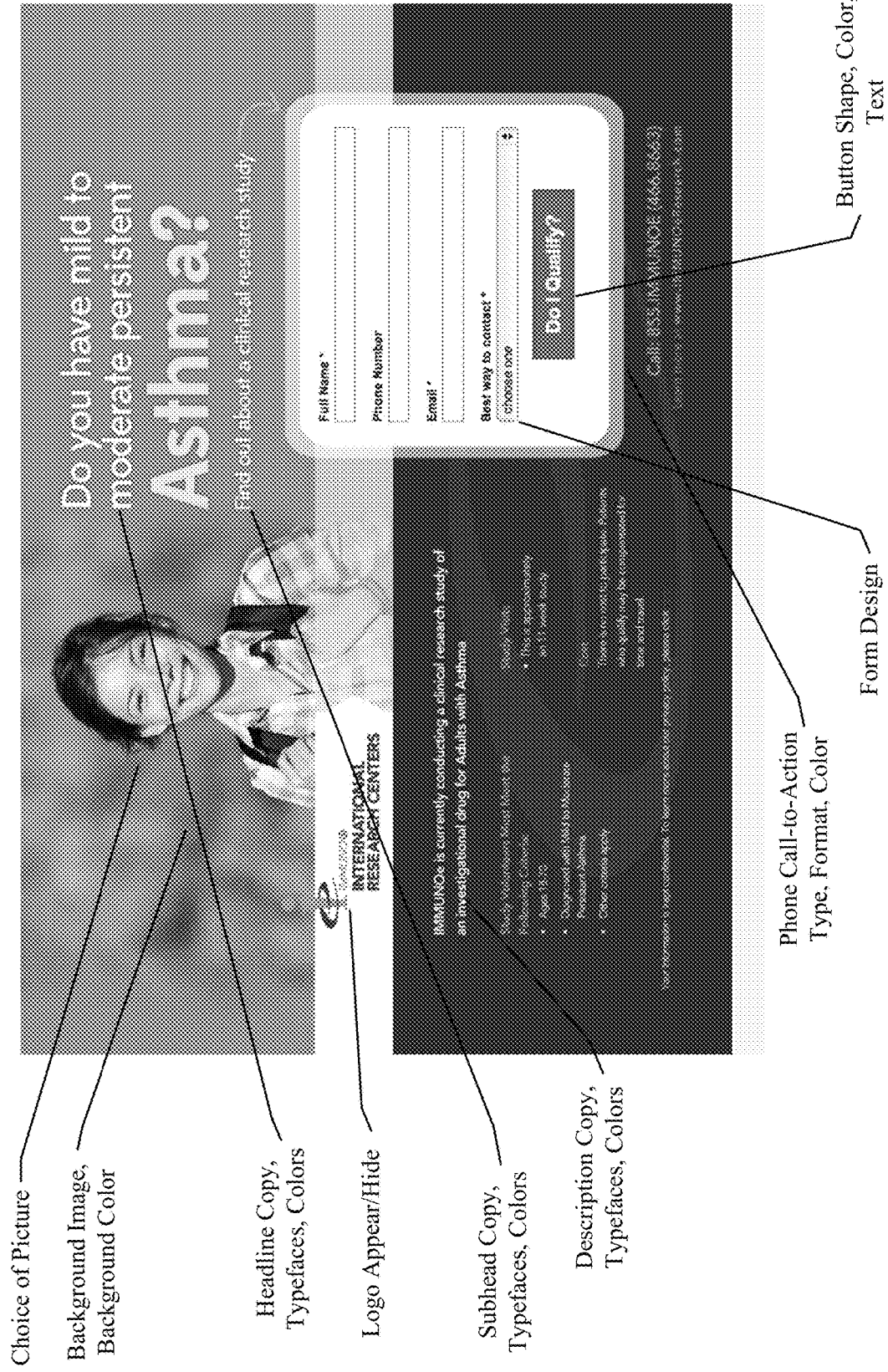
FIG. 6 shows a webinterface of a funnel with its dimensions and dimension values that is used to initialze an output layer of a neural network represented by a genome.

FIG. 6 shows one implementation of a webinterface of a funnel. In FIG. 6, the webinterface is defined by the arrangement or position of different page elements/dimensions in the webinterface layout, and corresponding properties or values of the page elements/dimensions, including, choice of picture (page element/dimension), background image (page element/dimension), background color (page element property/dimension value), headline copy (page element/dimension), typefaces and colors of the headline copy (page element property/dimension value), appearance or concealment of logo (page element/dimension), subhead copy (page element/dimension), typefaces and colors of the subhead copy (page element property/dimension value), description copy (page element/dimension), typefaces and colors of the description copy (page element property/dimension value), phone call-to-action (page element/dimension), type, format, and color of the phone call-to-action (page element property/dimension value), form design (page element/dimension), button (page element/dimension), and shape, color, and text of the button (page element property/dimension value).

The designer can define the starter dimensions and starter dimension values of the starter funnel using any data type. Examples of some data types include binary data type (0 or 1), quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type. For example, the starter dimensions and starter dimension values can be based on, or any combination thereof, real values between 0 and 1, continuous values such as Red, Green, Blue (RGB) values between 0 and 256, hexadecimal values of CSS colors (e.g., #F0F8FF), categorical color values of CSS colors (e.g., AliceBlue), respective values of other CSS property groups and properties (such as the ones listed on the web at <http://www.w3schools.com/cssref/#animation>), size of a particular dimension (e.g., height and width), a set of different values and data types (e.g., different numeric dollar price values or a combination of different numeric dollar price values and heights and widths), and others.

Once created, a preview of the starter funnel, and its comprising starter webinterfaces, is presented to the designer across the interface 304.

With the definition of the starter funnel understood, the discussion now turns to how the output layer of the neural network represented by a genome is initialized at runtime based on the starter funnel.

FIG. 7 is a symbolic drawing of one implementation of transforming an editor design representation 702 of a starter funnel into a runtime design representation 712. At runtime 322, the editor design representation 702 of the starter funnel defined by the designer is transformed into the runtime design representation 712. In the example used in FIG. 7, the editor design representation 702 includes a "tree". The output layer and its hyperparameters can be based on any level of the tree. The root of the tree is the highest level of granularity for which a test is performed. For a website or mobile webpage, the root is the domain. For mobile applications, the root is the application. For e-mails, the root is the e-mail; the subject and pages are next level of the tree. For other applications (such as advertising), different mappings can be used. In the domain of webpages and mobile applications, a website has one to n funnels; each funnel has a goal, and one to n pages. Each page has one to n clusters of elements. Each cluster has one to n elements. Each element has a set of sub-elements that change a property of the element. As used herein, sub-elements are elements too. Each sub-element has one to n values. In other implementations, the structure might be different. For example, elements might not be clustered, or the representation might not be hierarchical at all.

FIG. 8 shows different exemplary implements of initializing an output layer using different levels of granularity of a starter funnel defined a designer. In the example shown in the FIG. 8, the output layer and its hyperparameters can be based on clusters 802, elements 804, sub-elements 806, or sub-element values 808, or any combination thereof.

Accordingly, the output layer can be configured to provide output in any format. In one example, the output can be in the form of binary encoding 810. Examples of other output formats include quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type. For example, the output can be based on, or any combination thereof, real values between 0 and 1, continuous values such as Red, Green, Blue (RGB) values between 0 and 256, hexadecimal values of CSS colors (e.g., #F0F8FF), categorical color values of CSS colors (e.g., AliceBlue), respective values of other CSS property groups and properties (such as the ones listed on the web at <http://www.w3schools.com/cssref/#animation>), size of a particular dimension (e.g., height and width), a set of different values and data types (e.g., different numeric dollar price values or a combination of different numeric dollar price values and heights and widths), and others.

Furthermore, various interpretation schemes can be employed to interpret the output of the output layer. For instance, in the example shown in FIG. 2, the binary encoding is used to interpret values for sub-elements and elements of the output funnel. In other implementations, a continuous encoding of much fewer output neurons of the output layer can be used to provide continuous output for elements values and/or sub-element values, and a "range-based" interpretation scheme can be utilized to determine corresponding values for the sub-elements. In yet other implementations, a "predictive" interpretation scheme can include predicting the value of a set of elements and/or sub-elements in dependence upon the values of another set of elements and/or sub-elements identified by the output layer. The reader will appreciate that many other options are possible interpretation schemes.

Frontend Presentation

Figure 9:
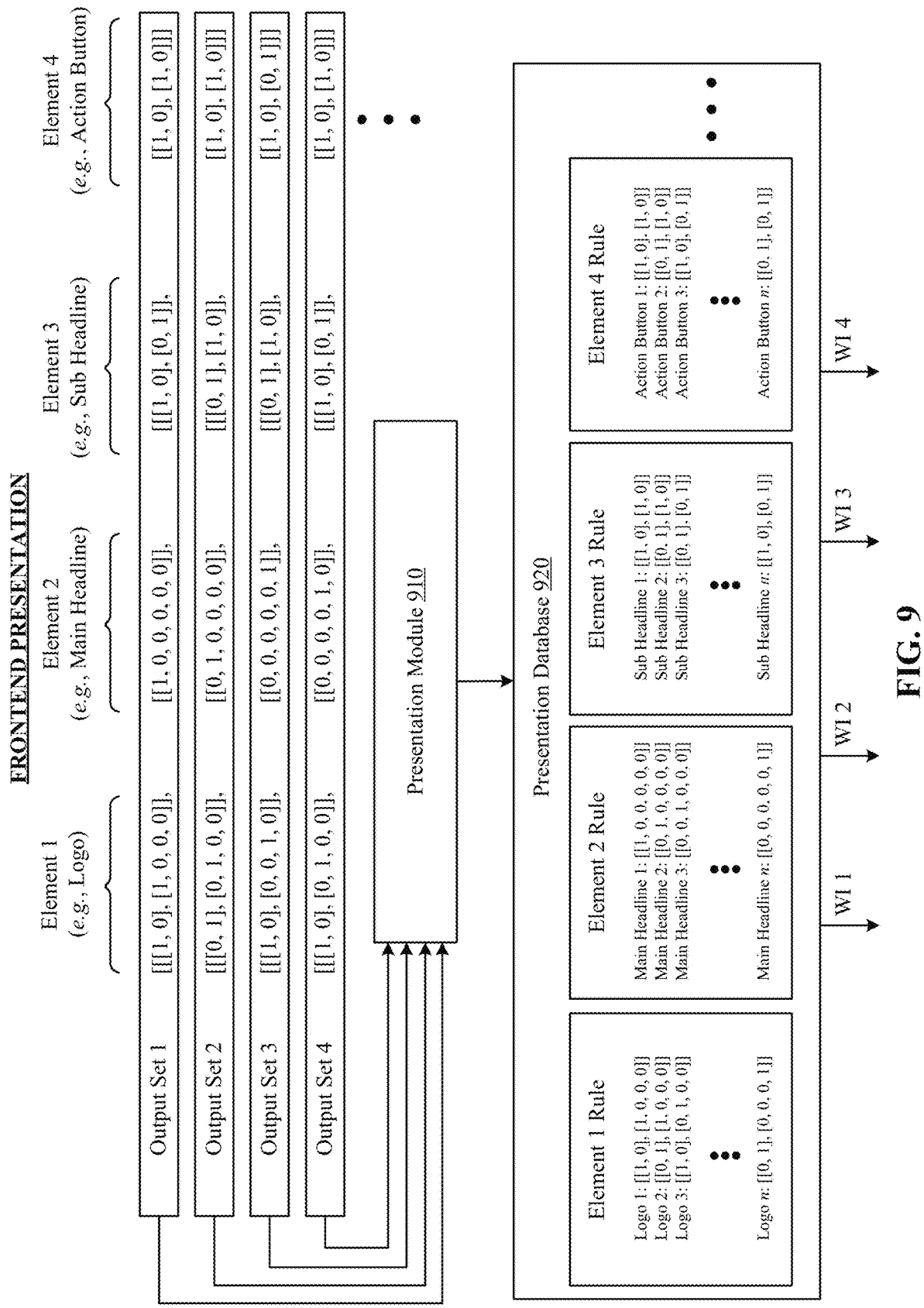
FIGS. 9 and 10 aspects of the frontend presentation module of FIG. 1.
Figure 10:
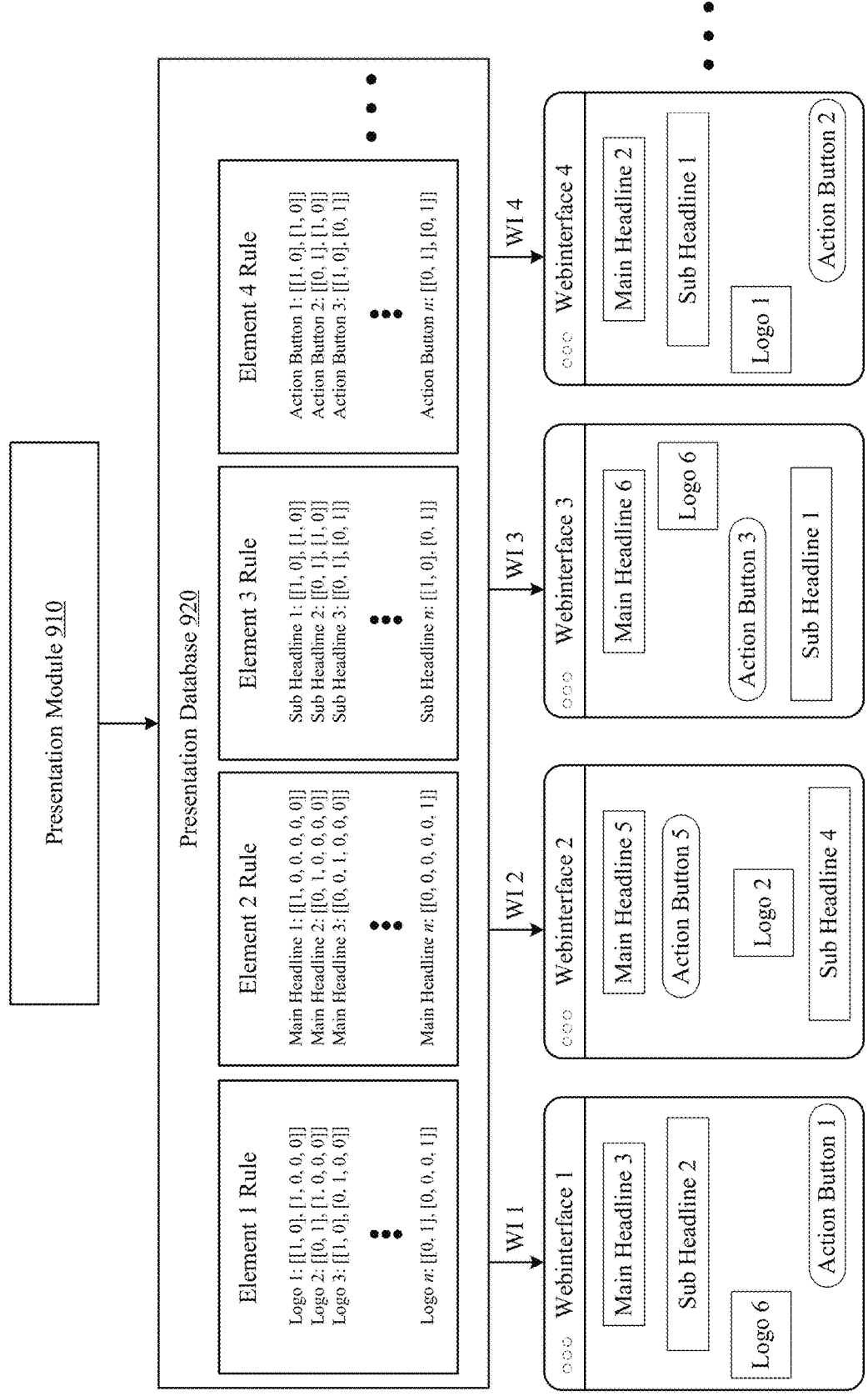

FIGS. 9 and 10 show one implementation of generating output funnels of one or more webinterfaces for frontend presentation to the end users in dependence upon dimension values produced by one or more neural networks represented by the genomes of the individuals. FIG. 10 shows four sets of dimension values based on which four webinterfaces are generated.

FIG. 9 also shows that dimension values for each output funnel are represented by a binary sequence (string). Each binary sequence is further compartmentalized into sub-sequences (sub-strings). Each sub-sequence represents a dimension and corresponding dimension value for an output funnel. Accordingly, each sub-sequence identifies a sub-element and corresponding sub-element value for the webinterfaces that are to be generated in dependence upon the output sets (OS 1 to OS 4). In implementations where the webinterfaces are frontend (e.g., graphical) objects comprising content, the sub-sequences identify frontend (e.g., graphical) elements/components and corresponding element/component values that are to be included in the webinterfaces generated based on the output sets (OS 1 to OS 4).

Note that in the implementation of FIGS. 9 and 10, each element of output sets (OS 1 to OS 4) is encoded as a fixed-length substring of bits grouped as sub-sequences. For example, the sub headline element has four bits grouped into two sub-sequences. For each sub-sequence, only one of the bits can be active or "hot" (e.g., represented by "1") so as to identify a particular dimension value from a set of available dimension values. The leftmost bit represents the "control" value of a sub-sequence, which, in one example, for main headline might indicate "plain text". The second, third, and forth bits might, for example, indicate "bold", "italics", and "bold underlined", respectively. It will be appreciated that many other encodings are possible in different implementations. For example, a 2-bit numeric value might be used, with "0" indicating the control, "1" indicating "bold", "2" indicating "italics", and "3" indicating "bold underlined".

In other implementations of FIGS. 9 and 10, an output set can be represented and comprising elements encoded using other schemes relying on data types other than binary data type (0 or 1), such as quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type. For example, the encoding of the output sets and the comprising elements in FIGS. 9 and 10 can be based on, or any combination thereof, real values between 0 and 1, continuous values such as Red, Green, Blue (RGB) values between 0 and 256, hexadecimal values of CSS colors (e.g., #F0F8FF), categorical color values of CSS colors (e.g., AliceBlue), respective values of other CSS property groups and properties (such as the ones listed on the web at <http://www.w3schools.com/cssref/#animation>), size of a particular dimension (e.g., height and width), a set of different values and data types (e.g., different numeric dollar price values or a combination of different numeric dollar price values and heights and widths), and others.

The output sets (OS 1 to OS 4) are generated and provided by the forward pass module 108, as discussed above. The frontend presentation module 110 then utilizes a presentation database 920 and a presentation module 910 to transform the output sets (OS 1 to OS 4) into output funnels of one or more webinterfaces.

The presentation database 920 serves as a rule repository that identifies a frontend element value for each of at least one available value of each of the dimensions of the funnel. The presentation module 910 applies a selected one of the output set to the presentation database 920 to determine frontend element values corresponding to dimension values identified by the selected output set. Accordingly, the presentation module 910 is able to evaluate an output set provided by the forward pass module 108 against the presentation database 920 generate an appropriate variation of the funnel based on the output set.

Presentation database 920 includes various element rules. In the presentation database 920, element rules are provided for all possible dimensions in the funnel search space, i.e., all possible frontend (e.g., graphical) elements/components that can be included in a webinterface. Also, each element rule includes pointers identifying all possible dimension values or page element/component values for a given dimension or page element/component. For example, a "sub headline" element rule includes pointers for all possible properties of the "sub headline" element, such as color, text, size, placement, and the like.

For a selected output set, the presentation module 910 accesses the presentation database 920 and evaluates the applicable element rule for each sub-sequence in the selected output set. In FIG. 9's example, element 1 rule is identified for all the logo sub-sequences, element 2 rule is identified for all the main head line sub-sequences, element 3 rule is identified for all the sub headline sub-sequences, and element 4 rule is identified for all the action button sub-sequences. Further, each element rule identifies a pointer for the respective sub-sequence values and generates corresponding frontend (e.g., graphical) elements/components and element/component values.

In one implementation, when one of the available values for each of the dimensions is a default value, the resulting funnel has a default frontend element value for the default dimension value of each of the dimensions. In such an implementation, the presentation module 910 applies the selected output set to the presentation database 920 to determine frontend element values corresponding to all dimension values identified by the selected output set other than the default dimension value for each of the dimensions.

In other implementations, a funnel customization specification memory is utilized, which stores, for a particular variation of the webinterface funnel, a value for each of the dimensions of the funnel. In such an implementation, the presentation module 910 presents toward a user a funnel having frontend element values indicated by the presentation database 920 as corresponding to the dimension values stored in the funnel customization specification memory. The funnel customization specification memory is also updated with a new set of values for each of the dimensions of the funnel. Updated values for the funnel customization specification memory are retrieved in response to user behavior for entering the funnel (e.g., user providing a landing page URL via a browser). In addition, the presentation module 910 accesses the presentation database 920 in response to user behavior (e.g., user providing a landing page URL via a browser).

In one implementation, when one of the available values for each of the dimensions is a default value, the funnel has a default frontend element value for the default dimension value of each of the dimensions. In such an implementation, the funnel presented toward the user by the presentation module 910 has frontend element values indicated by the presentation database 920 as corresponding to all of the dimension values identified in the funnel customization specification memory other than the default dimension value for each of the dimensions.

In FIG. 10, four webinterfaces (WI 1 to WI 4) are generated by the presentation module 910 in dependence upon each of the output sets (OS 1 to OS 4). Each of the webinterfaces include frontend (e.g., graphical) elements/ components and element/component values identified by the rules in the presentation database 920. Then, the webinterfaces (WI 1 to WI 4) are presented to the end users for live online evaluation 112.

In server-side implementations of the technology disclosed, the forward pass module 108 is implemented and executed at the server such that the neural networks are run at the server. In client-side implementations of the technology disclosed, the forward pass module 108 is implemented and executed at the user device such that the neural networks are run at the user device.

Machine-Learned User Device (MLUD)

Figure 11:
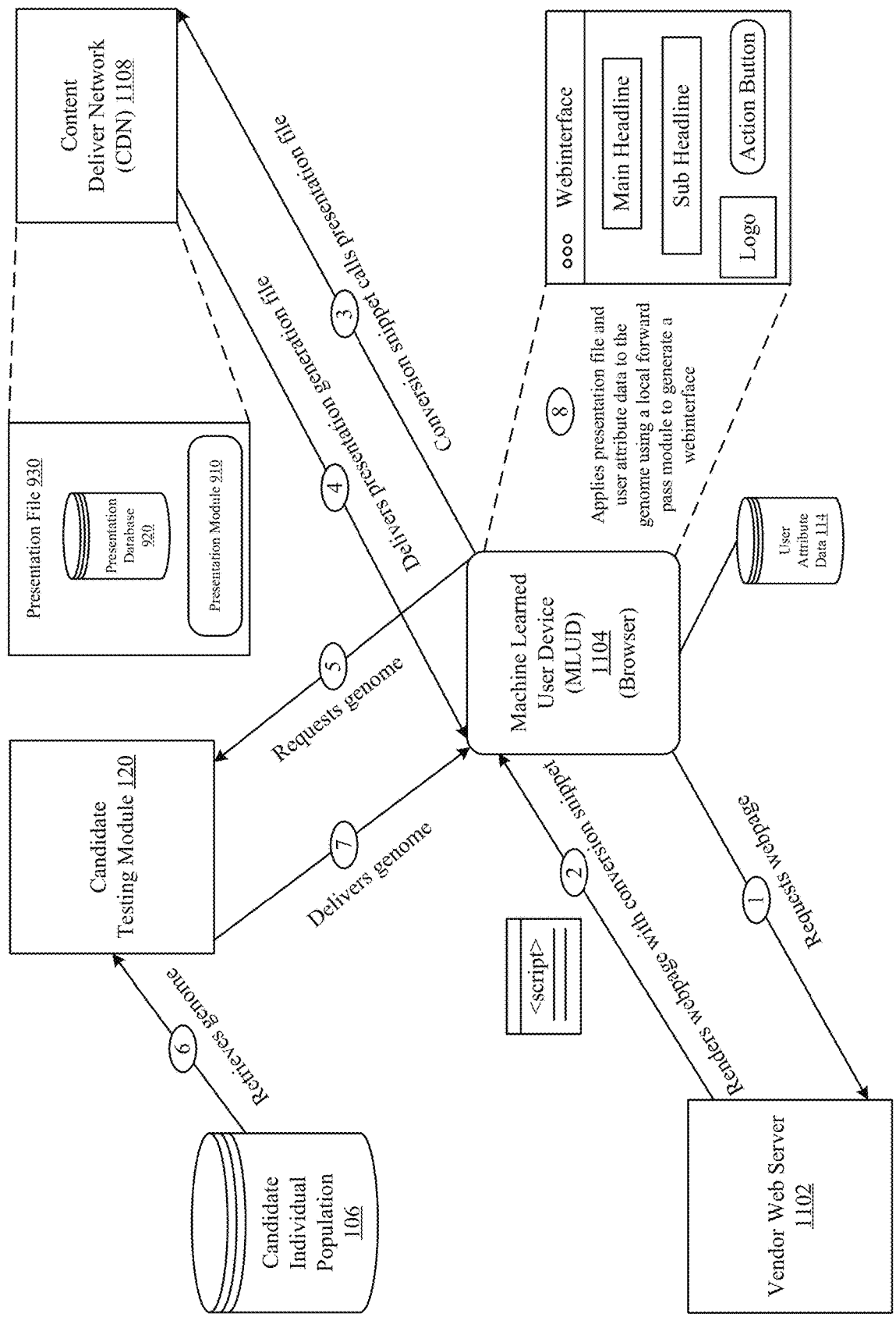
FIG. 11 is one implementation of a machine-learned user device (MLUD).

FIG. 11 illustrates one implementation of an improved user device, referred to herein as the "machine-learned user device" (MLUD). In FIG. 11, an end user uses a browser running on a MLUD 1104 to access a vendor website. The vendor web server is configured to deploy a conversion snippet, as part of a webpage, to the MLUD 1104 in response to the end user accessing the vendor website. After the conversion snippet is sent to the MLUD 1104 and before the webpage is rendered to the end user, the conversion snippet invokes a network server infrastructure. The network server infrastructure includes the candidate testing module 120, the candidate individual population 106, and a content delivery network (CDN) 1108.

The conversion snippet, deployed at the MLUD 1104, retrieves a presentation file 930 from the CDN 1108 and stores the presentation file 930 at the MLUD 1104. The CDN 1108 is pre-loaded with the presentation file 930. Examples of common CDN services today include Akamai™, CloudFlare™, CloudFront™, Fastly™, MaxCDN™, KeyCDN™, Incapsula™, and GlobalDots™. The presentation file 930 includes the presentation database 920 and the presentation module 910, discussed above.

Then, the conversion snippet, deployed at the MLUD 1104, requests a genome from the candidate testing module 120. In response, the candidate testing module 120 retrieves a genome from the candidate individual population 106 and delivers the selected genome to the MLUD 1104.

Then, the MLUD 1104, having received the selected genome from the candidate testing module 120 and the presentation file 930 from the CDN 1108, executes a neural network represented by the genome using the user attribute data 114 as input and produces dimension values for an output funnel. In one implementation, the MLUD 1104 utilizes a local forward pass module to execute the neural network represented by the genome.

Then, the MLUD 1104 executes the presentation module 910. The presentation module 910 evaluates the dimension values against the rules of the presentation database 920 and generates an output funnel of one or more webinterfaces, as discussed above. Accordingly, a standard user device is improved to execute a neural network and generate algorithmically evolved webinterfaces.

Machine-Learned Content Delivery Network (MLCDN)

Figure 12:
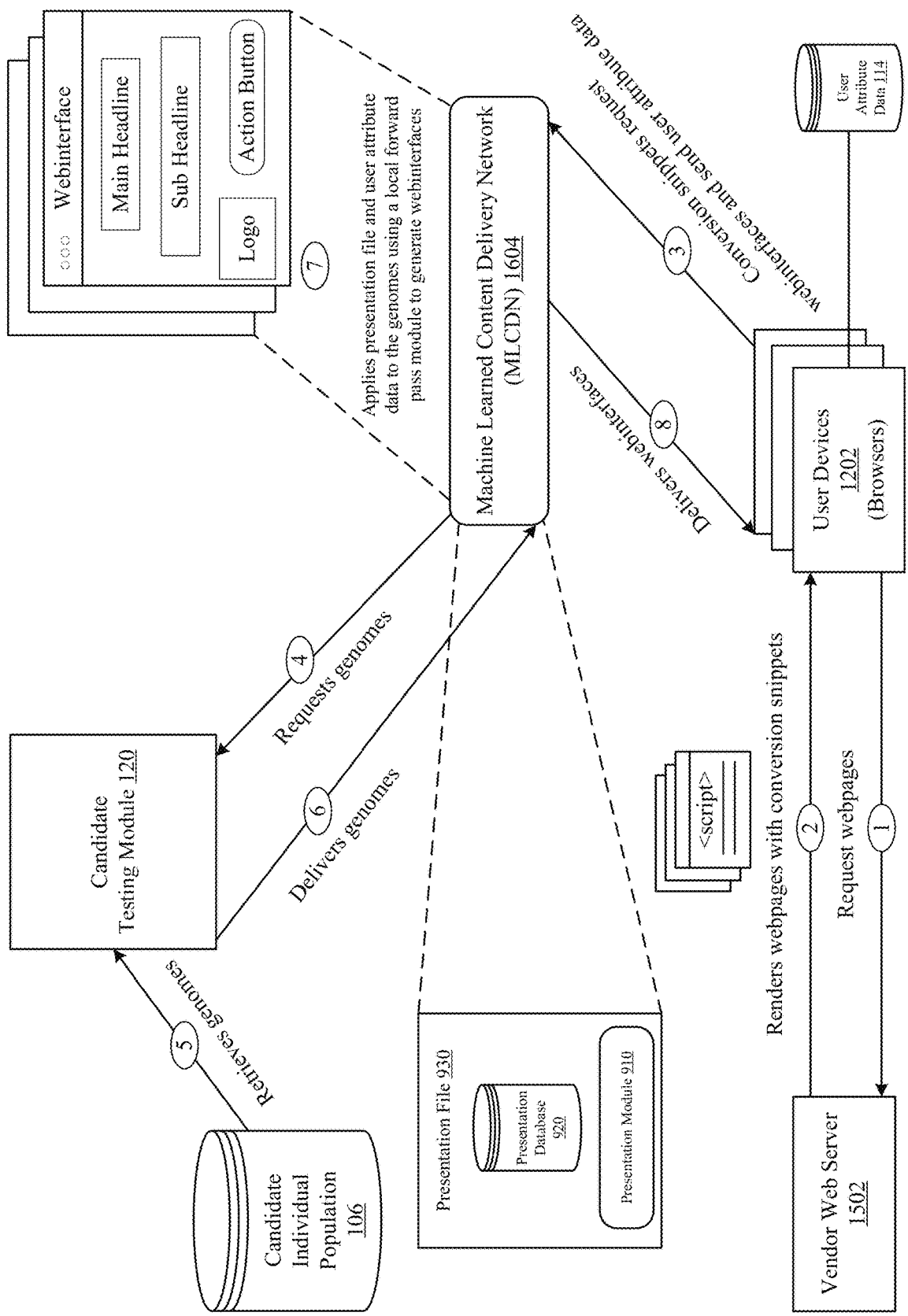
FIG. 12 illustrates one implementation of a machine-learned content delivery network (MLCDN).

FIG. 12 illustrates one implementation of an improved content delivery network (CDN), referred to herein as the "machine-learned content delivery network" (MLCDN). In FIG. 12, end users use browsers running on user devices 1202 to access a vendor website. The vendor web server is configured to deploy a conversion snippet, as part of a webpage, to the user devices 1202 in response to the end users accessing the vendor website. After the conversion snippet is sent to the user devices 1202 and before the webpage is rendered to the end users, the conversion snippet invokes a network server infrastructure. The network server infrastructure includes the candidate testing module 120, the candidate individual population 106, and a content delivery network (CDN) 1108.

The MLCDN 1204 is pre-loaded with the presentation file 930. The presentation file 930 includes the presentation database 920 and the presentation module 910, discussed above.

Then, the MLCDN 1204 requests a genome from the candidate testing module 120. In response, the candidate testing module 120 retrieves a genome from the candidate individual population 106 and delivers the selected genome to the MLCDN 1204.

Then, the MLCDN 1204, having both the selected genome and the presentation file 1330, executes a neural network represented by the genome using the user attribute data 114 as input and produces dimension values for an output funnel. In one implementation, the MLUD 1104 utilizes a local forward pass module to execute the neural network represented by the genome.

Then, the MLCDN 1204 executes the presentation module 910. The presentation module 910 evaluates the dimension values against the rules of the presentation database 920 and generates an output funnel of one or more webinterfaces, as discussed above. Accordingly, a standard user device is improved to execute a neural network and generate algorithmically evolved webinterfaces.

Then, the MLCDN 1204 executes the presentation module 910. The presentation module 910 evaluates the dimension values against the rules of the presentation database 920 and generates an output funnel of one or more webinterfaces, as discussed above. Accordingly, a standard CDN is improved to execute a neural network and generate algorithmically evolved webinterfaces.

Computer System

Figure 13:
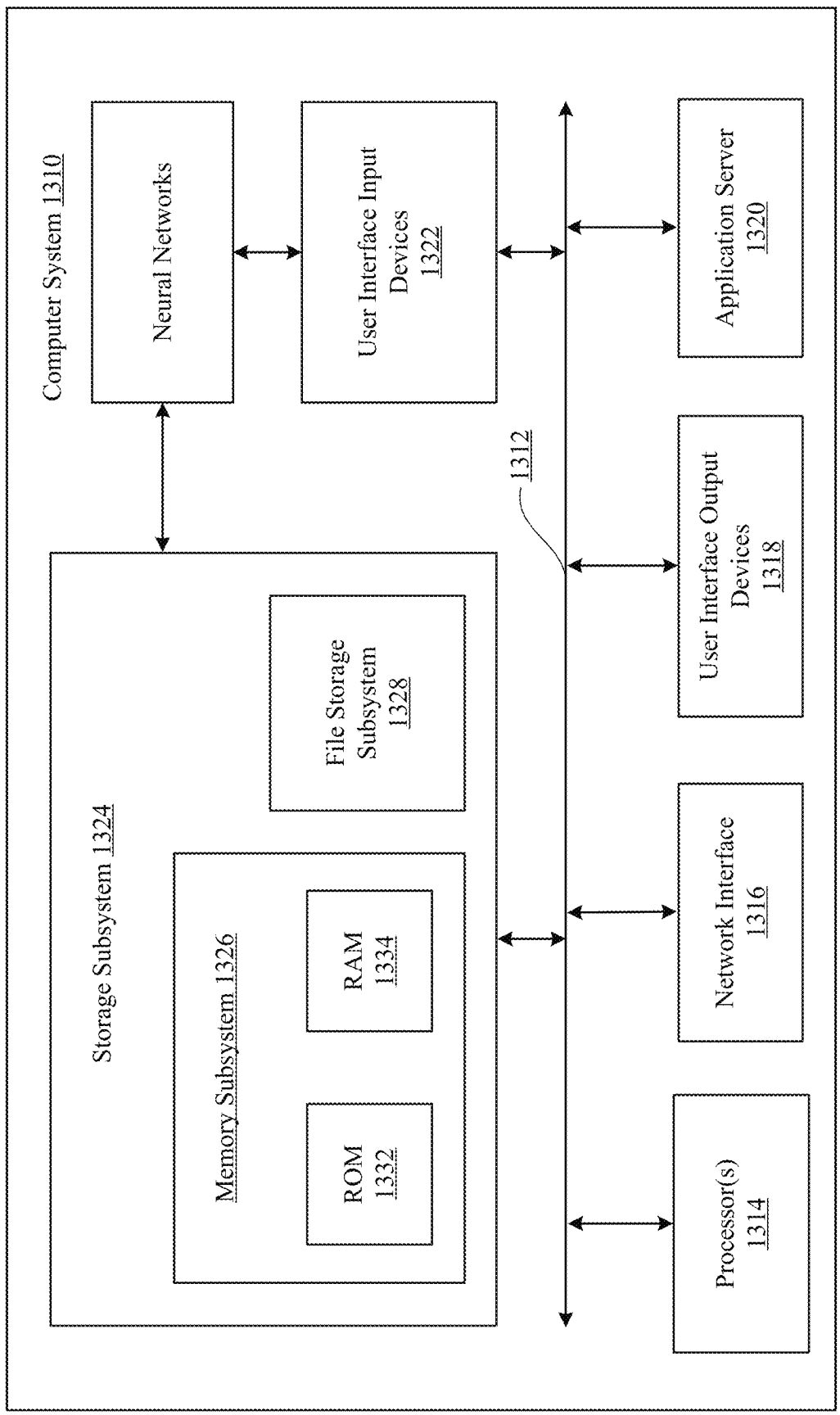
FIG. 13 is a simplified block diagram of a computer system that can be used to implement the technology disclosed.

FIG. 13 is a simplified block diagram of a computer system that can be used to implement the technology disclosed. Computer system 1310 typically includes at least one processor 1314 that communicates with a number of peripheral devices via bus subsystem 1312. These peripheral devices can include a storage subsystem 1324 including, for example, memory devices and a file storage subsystem, user interface input devices 1322, user interface output devices 1318, and a network interface subsystem 1316. The input and output devices allow user interaction with computer system 1310. Network interface subsystem 1316 provides an interface to outside networks, including an interface to corresponding interface devices in other computer systems.

In one implementation, the conversion system 104 is communicably linked to the storage subsystem 1324 and a user interface input devices 1322.

User interface input devices 1322 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1310.

User interface output devices 1318 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1310 to the user or to another machine or computer system. Storage subsystem 1324 stores programming and data constructs that provide the functionality of some or all of the modules and methods described herein. These software modules are generally executed by processor 1314 alone or in combination with other processors.

Memory 1326 used in the storage subsystem can include a number of memories including a main random access memory (RAM) 1334 for storage of instructions and data during program execution and a read only memory (ROM) 1332 in which fixed instructions are stored. A file storage subsystem 1328 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1328 in the storage subsystem 1324, or in other machines accessible by the processor.

Bus subsystem 1312 provides a mechanism for letting the various components and subsystems of computer system 1310 communicate with each other as intended. Although bus subsystem 1312 is shown schematically as a single bus, alternative implementations of the bus subsystem can use multiple busses. Application server 1320 can be a framework that allows the applications of computer system 1310 to run, such as the hardware and/or software, e.g., the operating system.

Computer system 1310 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1310 depicted in FIG. 13 is intended only as a specific example for purposes of illustrating the preferred embodiments of the present invention.

Many other configurations of computer system 1310 are possible having more or less components than the computer system depicted in FIG. 13.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A non-transitory computer readable storage medium impressed with computer program instructions to produce and deploy webinterfaces, the instructions, when executed on a processor, implement a method comprising:
    providing a presentation database which identifies a frontend element value for each of at least one available value of each dimension of a funnel of a webinterface;
    determining from a neural network funnel dimension values in dependence upon user attribute data;
    applying the determined funnel dimension values to the presentation database to determine frontend element values; and
    presenting toward a user the funnel having the determined frontend element values.

2. The non-transitory computer readable storage medium of claim 1, wherein the webinterface represents a webpage.

3. The non-transitory computer readable storage medium of claim 1, wherein the webinterface represents a mobile application.

4. The non-transitory computer readable storage medium of claim 1, wherein the webinterface represents an e-mail.

5. The non-transitory computer readable storage medium of claim 1, wherein the webinterface represents a social media message.

6. The non-transitory computer readable storage medium of claim 1, wherein the webinterface represents a social media feed item.

7. The non-transitory computer readable storage medium of claim 1, wherein the webinterface represents a chat message.

8. A non-transitory computer readable storage medium impressed with computer program instructions to deploy a customizable webinterface funnel that is customizable along a plurality of dimensions, the instructions, when executed on a processor, implement a method comprising:
    providing a presentation database which identifies a frontend element value for each of at least one available value of each dimension of a funnel of a webinterface;
    determining from a neural network funnel dimension values in dependence upon user attribute data;
    applying the determined funnel dimension values to the presentation database to determine frontend element values; and
    presenting toward a user a funnel having the determined frontend element values.

9. The non-transitory computer readable storage medium of claim 8, wherein the webinterface represents a webpage.

10. The non-transitory computer readable storage medium of claim 8, wherein the webinterface represents a mobile application.

11. The non-transitory computer readable storage medium of claim 8, wherein the webinterface represents an e-mail.

12. The non-transitory computer readable storage medium of claim 8, wherein the webinterface represents a social media message.

13. The non-transitory computer readable storage medium of claim 8, wherein the webinterface represents a social media feed item.

14. The non-transitory computer readable storage medium of claim 8, wherein the webinterface represents a chat message.

15. A non-transitory computer readable storage medium impressed with computer program instructions to produce and deploy webinterfaces, the instructions, when executed on a processor, implement a method comprising:
    providing network server infrastructure which, in response to one or more first requests received over a network, returns toward a first client computer system:
        a presentation database which identifies a frontend element value for each of at least one available value of each dimension of a funnel of a webinterface; and
        a presentation module which:
            determines from a neural network funnel dimension values in dependence upon user attribute data,
            applies the determined funnel dimension values to the presentation database to determine frontend element values, and
            presents toward a user the funnel having the determined frontend element values.

16. The non-transitory computer readable storage medium of claim 15, wherein the webinterface represents a webpage.

17. The non-transitory computer readable storage medium of claim 15, wherein the webinterface represents a mobile application.

18. The non-transitory computer readable storage medium of claim 15, wherein the webinterface represents an e-mail.

19. The non-transitory computer readable storage medium of claim 15, wherein the webinterface represents a social media message.

20. The non-transitory computer readable storage medium of claim 15, wherein the webinterface represents a social media feed item.

\* \* \* \* \*